(12) United States Patent
Chu et al.

(10) Patent No.: US 12,041,577 B2
(45) Date of Patent: *Jul. 16, 2024

(54) NULL DATA PACKET (NDP) RANGING MEASUREMENT FEEDBACK

(71) Applicant: Marvell Asia Pte Ltd, Singapore (SG)

(72) Inventors: Liwen Chu, San Ramon, CA (US); Hongyuan Zhang, Fremont, CA (US); Christian R. Berger, San Jose, CA (US); Niranjan Grandhe, San Jose, CA (US); Sudhir Srinivasa, Los Gatos, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,063

(22) Filed: Sep. 14, 2022

(65) Prior Publication Data

US 2023/0007618 A1 Jan. 5, 2023

Related U.S. Application Data

(63) Continuation of application No. 17/131,181, filed on Dec. 22, 2020, now Pat. No. 11,452,063, which is a
(Continued)

(51) Int. Cl.
*H04W 64/00* (2009.01)
*G01S 5/00* (2006.01)
(Continued)

(52) U.S. Cl.
CPC ......... *H04W 64/003* (2013.01); *G01S 5/0036* (2013.01); *G01S 5/0063* (2013.01);
(Continued)

(58) Field of Classification Search
CPC ........ G01S 5/0205; G01S 5/14; G01S 13/765; G01S 5/0072; G01S 11/02; G01S 11/00;
(Continued)

(56) References Cited

U.S. PATENT DOCUMENTS 8,942,214 B2 1/2015 Lee et al.
9,112,741 B2 8/2015 Breit
(Continued)

FOREIGN PATENT DOCUMENTS

| CN | 102549992 A | 7/2012 |
| CN | 106454930 A | 2/2017 |
| WO | 2018102247 A2 | 6/2018 |

OTHER PUBLICATIONS

First Office Action in Chinese Application No. 201880027327.4 dated Feb. 28, 2023. (11 pages).
(Continued)

*Primary Examiner* — Khawar Iqbal

(57) ABSTRACT

A first client station receives from an access point an indication of whether angular information is to be included in feedback information in a range measurement session. The first client station transmits a null data packet (NDP) as part of an uplink multi-user (MU) PHY transmission that also includes simultaneous transmissions by one or more second client stations of one or more other respective NDPs to the access point as part of the range measurement session. The first client station receives a downlink physical layer (PHY) data unit from the access point that includes respective downlink feedback frames for the first client station and the one or more second client stations. When angular information is to be included in the feedback, a downlink feedback frame for the first client station includes angular information.

22 Claims, 20 Drawing Sheets

Related U.S. Application Data continuation of application No. 15/947,451, filed on Apr. 6, 2018, now Pat. No. 10,880,855.

(60) Provisional application No. 62/536,366, filed on Jul. 24, 2017, provisional application No. 62/489,822, filed on Apr. 25, 2017.

(51) Int. Cl.
| | | |
|---|---|---|
| *G01S 5/02* | (2010.01) | |
| *H04B 7/0452* | (2017.01) | |
| *H04B 7/06* | (2006.01) | |
| *H04L 25/02* | (2006.01) | |
| *H04W 4/02* | (2018.01) | |
| *H04W 84/12* | (2009.01) | |

(52) U.S. Cl.
CPC .......... *G01S 5/0236* (2013.01); *G01S 5/0257* (2013.01); *H04B 7/0452* (2013.01); *H04B 7/0636* (2013.01); *H04L 25/0202* (2013.01); *H04W 84/12* (2013.01)

(58) Field of Classification Search
CPC ..... G01S 5/02; H04W 72/121; H04W 68/005; H04W 64/00; H04W 24/08; H04W 24/10; H04W 4/02; H04W 4/029; H04W 84/12; H04W 88/02; H04W 56/00; H04W 64/003

See application file for complete search history.

(56) References Cited

U.S. PATENT DOCUMENTS

| | | | |
|---|---|---|---|
| 9,261,580 | B2 | 2/2016 | Banin et al. |
| 10,200,964 | B2 | 2/2019 | Amizur |
| 10,247,808 | B2 | 4/2019 | Sanderovich et al. |
| 10,609,187 | B2 * | 3/2020 | Venkatesan ............. H04W 4/02 |
| 10,880,855 | B2 * | 12/2020 | Chu ..................... H04W 64/003 |
| 11,109,356 | B2 * | 8/2021 | Jiang ...................... G01S 5/0226 |
| 11,452,063 | B2 | 9/2022 | Chu et al. |
| 2004/0185870 | A1 | 9/2004 | Matsuda |
| 2012/0270572 | A1 | 10/2012 | Siomina et al. |
| 2014/0213193 | A1 | 7/2014 | Zhang |
| 2015/0146812 | A1 | 5/2015 | Chu et al. |
| 2016/0139236 | A1 | 5/2016 | Segev |
| 2016/0204960 | A1 | 7/2016 | Yu |
| 2016/0262051 | A1 | 9/2016 | Merlin et al. |
| 2016/0323879 | A1 | 11/2016 | Ghosh et al. |
| 2016/0366548 | A1 | 12/2016 | Wang et al. |
| 2017/0054542 | A1 | 2/2017 | Vermani et al. |
| 2017/0111924 | A1 * | 4/2017 | Josiam ................. H04B 7/0645 |
| 2017/0127412 | A1 | 5/2017 | Amizur |
| 2017/0156148 | A1 | 6/2017 | Park et al. |
| 2017/0250831 | A1 * | 8/2017 | Aldana ................. G01S 5/0009 |
| 2017/0251332 | A1 * | 8/2017 | Aldana ................... G01S 5/021 |
| 2017/0251449 | A1 * | 8/2017 | Malik ............... H04W 56/0065 |
| 2017/0295558 | A1 | 10/2017 | Amizur et al. |
| 2018/0027561 | A1 | 1/2018 | Segev et al. |
| 2018/0139077 | A1 * | 5/2018 | Amizur ................ H04B 1/0064 |
| 2018/0205442 | A1 | 7/2018 | Oteri et al. |
| 2018/0249437 | A1 | 8/2018 | Lindskog et al. |
| 2018/0295601 | A1 | 10/2018 | Wang et al. |
| 2018/0310133 | A1 | 10/2018 | Ramasamy et al. |
| 2019/0041509 | A1 | 2/2019 | Jiang et al. |
| 2019/0268098 | A1 | 8/2019 | Chun et al. |
| 2019/0280832 | A1 | 9/2019 | Amizur et al. |
| 2019/0281484 | A1 * | 9/2019 | Jiang ..................... H04L 1/0026 |
| 2019/0361108 | A1 | 11/2019 | Jiang et al. |
| 2020/0014519 | A1 | 1/2020 | Segev et al. |
| 2020/0068655 | A1 | 2/2020 | Ghosh et al. |
| 2020/0092850 | A1 * | 3/2020 | Jiang ..................... H04W 72/04 |
| 2020/0256975 | A1 * | 8/2020 | Chu ...................... G01S 13/765 |
| 2020/0260313 | A1 | 8/2020 | Yang |
| 2020/0305110 | A1 * | 9/2020 | Amizur ................. H04W 64/00 |
| 2023/0007618 | A1 * | 1/2023 | Chu ..................... H04W 64/003 |

OTHER PUBLICATIONS

Search Report for Chinese Application No. 201880027327.4 dated Mar. 1, 2023. (3 pages).

Office Action in EP 18720884.8, dated Jun. 1, 2022 (8 pages).

IEEE P802.11axTM/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11axTM/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmcTM/D8.0, Aug. 2016, "Draft Standard for Information technology—Telecommunications and information exchange between systems—Local and metropolitan area networks—Specific requirements Part 11: Wireless LAN Medium Access Control (MAC) and Physical Layer (PHY) Specifications," The Institute of Electrical and Electronics Engineers, Inc., pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

Zhu et al., "IEEE P802.11, Wireless LANs, Proposed 802.11az Functional Requirements," Institute of Electrical and Electronics Engineers, doc. IEEE 802.11-16/0424r4, 6 pages (Mar. 13, 2017).

International Search Report and Written Opinion in International Patent Application No. PCT/US2018/026529, dated Jul. 20, 2018 (13 pages).

Communication pursuant to Article 94(3) EPC in European Patent Application No. 18720884.8, dated Sep. 10, 2020 (4 pages).

Second Office Action for Chinese Application No. 2018800273274, dated Sep. 29, 2023. (8 pages).

Search Report for Chinese Application No. 201880027327.4, mailed Mar. 14, 2024. (2 pages).

* cited by examiner

NULL DATA PACKET (NDP) RANGING MEASUREMENT FEEDBACK

CROSS REFERENCES TO RELATED APPLICATIONS

This application is a continuation of U.S. patent application Ser. No. 17/131,181, now U.S. Pat. No. 11,452,063, entitled "Null Data Packet (NDP) Ranging Measurement Feedback," which is a continuation of U.S. patent application Ser. No. 15/947,451, now U.S. Pat. No. 10,880,855, entitled "Null Data Packet (NDP) Ranging Measurement Feedback," filed on Apr. 6, 2018, which claims the benefit of U.S. Provisional Patent Application No. 62/489,822, entitled "Null Data Packet (NDP) Ranging Measurement Feedback," filed on Apr. 25, 2017, and U.S. Provisional Patent Application No. 62/536,366, entitled "Null Data Packet (NDP) Ranging Measurement Feedback," filed on Jul. 24, 2017. The disclosures of all of the applications referenced above are expressly incorporated herein by reference in their entireties.

FIELD OF TECHNOLOGY

The present disclosure relates generally to wireless communication systems, and more particularly to communication exchanges between wireless communication devices for measuring distances among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the determined distance. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can also be used for estimating the location of the first communication device.

SUMMARY

In an embodiment, a method for range measurement in a wireless communication network includes: at a first client station, receiving from an access point one or more indications of one or more types of feedback information, from among a plurality of types of feedback information associated with range measurements, that are to be communicated between the first client station and the access point in a range measurement session, the one or more indications including a first indication of whether angular information associated with range measurements are to be communicated between the first client station and the access point in the range measurement session; using, at the first client station, the one or more indications of the one or more types of feedback information received from the access point to determine the one or more types of feedback information that are to be communicated between the first client station and the access point in the range measurement session, including determining whether angular information associated with range measurements are to be communicated between the first client station and the access point in the range measurement session; receiving, at the first client station, a first downlink physical layer (PHY) data unit with one or more first trigger frames that are configured to prompt the first client station and one or more second client stations to transmit respective first null data packets (NDPs) a short interface space (SIFS) after an end of reception of the first downlink PHY data unit as part of the range measurement session; in response to receiving the first downlink PHY data unit having the one or more first trigger frames, transmitting, by the first client station, the respective first NDP to the access point as part of a first uplink multi-user (MU) PHY transmission that also includes simultaneous transmissions by the one or more second client stations of one or more other respective first NDPs to the access point as part of the range measurement session; receiving, at the first client station, a second downlink PHY data unit SIFS after an end of transmission of the first NDP by the first client station, wherein the second downlink PHY data unit includes one or more null data packet announcement (NDPA) frames that indicate that the access point will transmit a third downlink PHY data unit SIFS after an end of transmission of the second downlink PHY data unit, the third downlink PHY data unit having one or more second NDPs; receiving, by the first client station, the third downlink PHY data unit SIFS after the end of reception of the second downlink PHY data unit, the third downlink PHY data unit having the one or more second NDPs; and receiving, by the first client station, a fourth downlink PHY data unit from the access point SIFS after an end of reception of the third downlink PHY data unit, the fourth downlink PHY data unit including respective downlink feedback frames for the first client station and the one or more second client stations, wherein a first downlink feedback frame, among the respective downlink feedback frames, for the first client station includes, when angular information associated with range measurements are to be communicated between the first client station and the access point, first angular information corresponding to reception by the access point of a) the respective first NDP transmitted by the first client station or b) a third NDP previously transmitted by the first client station.

In another embodiment, a first client station is configured for use in a wireless local area network (WLAN). The first client station comprises a wireless network interface having one or more integrated circuit (IC) devices configured to: receive from an access point one or more indications of one or more types of feedback information, from among a plurality of types of feedback information associated with range measurements, that are to be communicated between the first client station and the access point in a range measurement session, the one or more indications including a first indication of whether angular information associated with range measurements are to be communicated between the first client station and the access point in the range measurement session; use the one or more indications of the one or more types of feedback information received from the access point to determine the one or more types of feedback information that are to be communicated between the first client station and the access point in the range measurement session, including determining whether angular information associated with range measurements are to be communicated between the first client station and the access point in the range measurement session; receive a first downlink physical layer (PHY) data unit with one or more first trigger frames that are configured to prompt the first client station and one or more second client stations to transmit respective first null data packets (NDPs) a short interface space (SIFS) after an end of reception of the first downlink PHY data unit as part of the range measurement session; control the wireless network interface to transmit, in response to receiving the first downlink PHY data unit having the one or more first trigger frames, the respective first NDP to the access point as part of a first uplink multi-user (MU) PHY transmission that also includes simultaneous transmissions by the one or more second client stations of one or more other respective first NDPs to the access point as part of the range measurement session; receive a second downlink PHY data unit SIFS after an end of transmission of the first NDP by the first client station, wherein the second downlink PHY data unit includes one or more null data packet announcement (NDPA) frames that indicate that the access point will transmit a third downlink PHY data unit SIFS after an end of transmission of the second downlink PHY data unit, the third downlink PHY data unit having one or more second NDPs; receive the third downlink PHY data unit SIFS after the end of reception of the second downlink PHY data unit, the third downlink PHY data unit having the one or more second NDPs; and receive a fourth downlink PHY data unit from the access point SIFS after an end of reception of the third downlink PHY data unit, the fourth downlink PHY data unit including respective downlink feedback frames for the first client station and the one or more second client stations, wherein a first downlink feedback frame, among the respective downlink feedback frames, for the first client station includes, when angular information associated with range measurements are to be communicated between the first client station and the access point, first angular information corresponding to reception by the access point of a) the respective first NDP transmitted by the first client station or b) a third NDP previously transmitted by the first client station.

DETAILED DESCRIPTION

Ranging measurement techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement techniques are utilized in other types of wireless communication systems such as personal area networks (PANs), mobile communication networks such as cellular networks, metropolitan area networks (MANs), etc.

Figure 1:
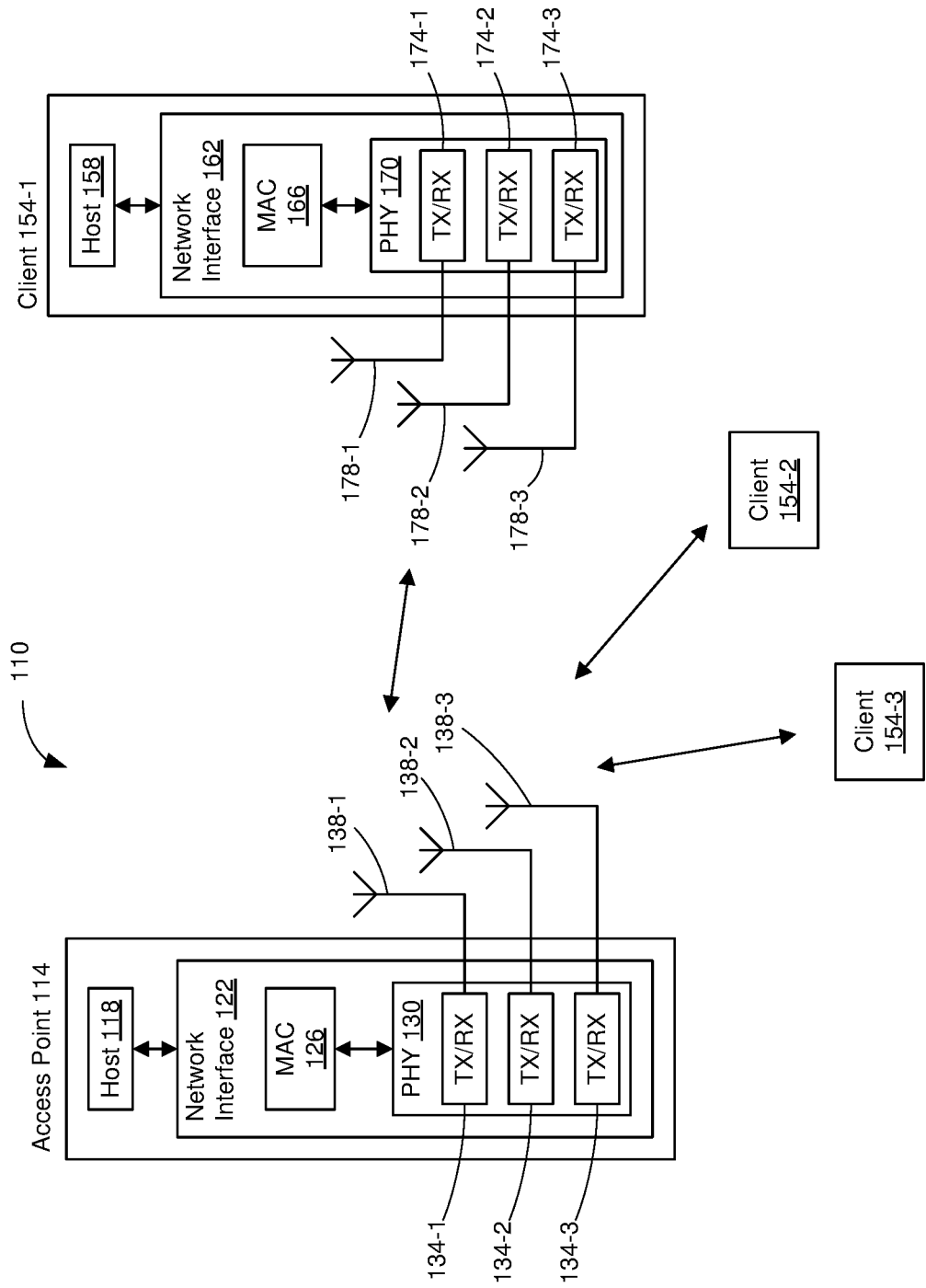
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
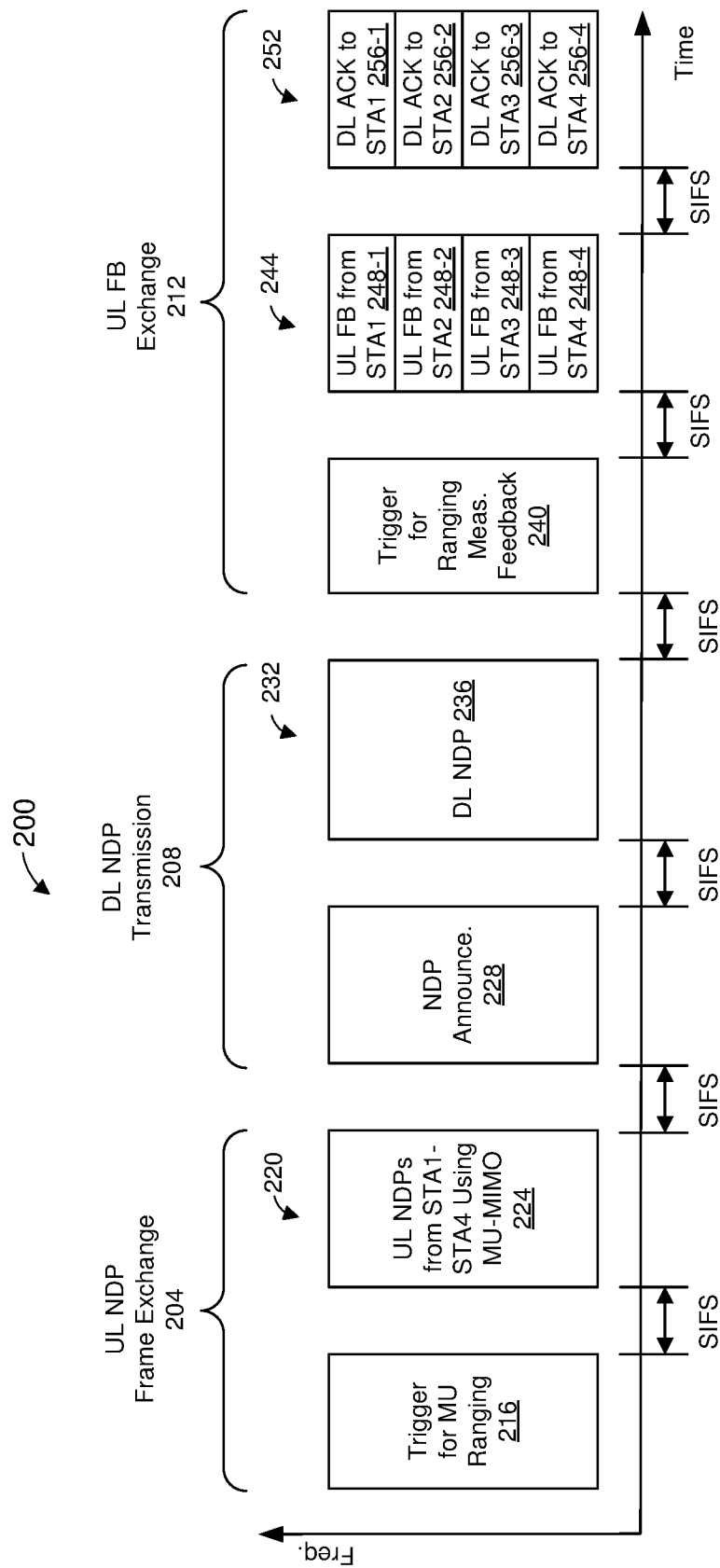
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

The MU ranging measurement exchange 200 corresponds to an AP-initiated MU ranging measurement exchange, according to an embodiment. The MU ranging measurement exchange 200 includes an uplink (UL) null data packet (NDP) frame exchange 204, a downlink (DL) NDP transmission portion 208, and an UL feedback frame exchange 212. In an embodiment, the uplink UL NDP frame exchange 204, the DL NDP transmission portion 208, and the UL feedback frame exchange 212 occur within a single transmit opportunity period (TXOP). In another embodiment, the uplink UL NDP frame exchange 204, the DL NDP transmission portion 208, and the UL feedback frame exchange 212 do not occur within a single TXOP.

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. The UL NDPs 224 omit data portions.

When transmitting the UL NDPs 224, each client station 154 records a time $t_{1,k}$ at which the client station 154 began transmitting the UL NDP 224, where k is an index indicating the particular client station 154. Similarly, when the AP 114 receives each UL NDP 224, the AP 114 records a time $t_{2,k}$ at which the AP 114 began receiving the UL NDP 224.

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
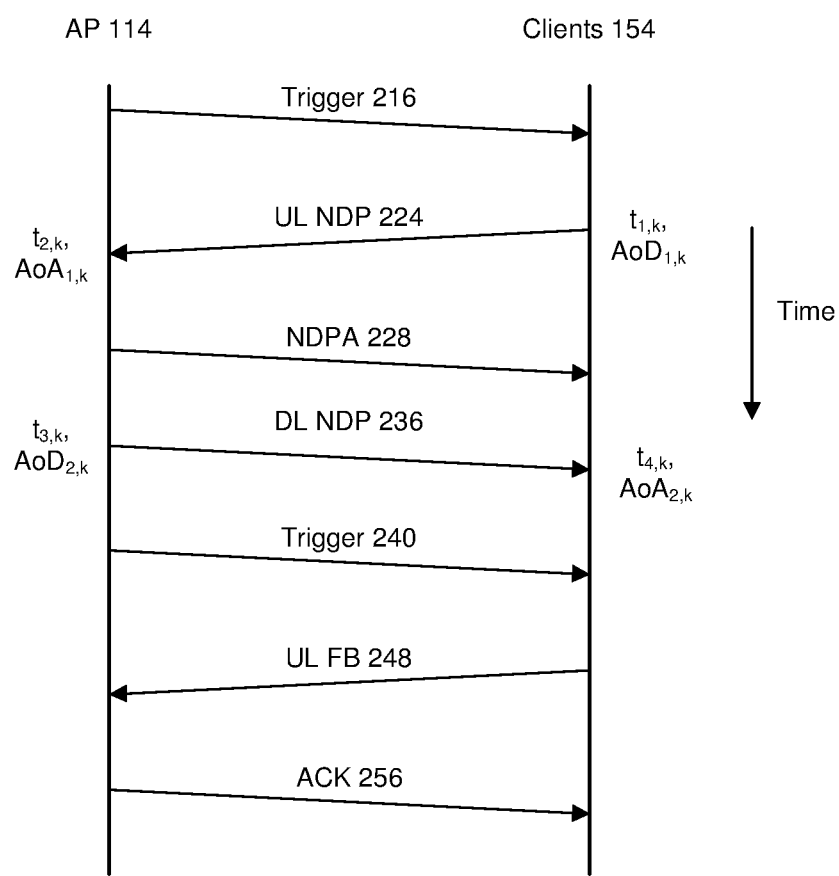
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the UL NDP 224, and records the $AoD_{1,k}$ at which the UL NDP 224 left the antennas 178 of the client station 154. Additionally, the AP 114 records the time $t_{2,k}$ at which the AP 114 began receiving each UL NDP 224, and the $AoA_{1,k}$ at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (with a broadcast address) to the client stations 154. The DL NDPs 236 include PHY preambles having one or more STFs, one or more LTFs and one or more signal fields, in an embodiment. The DL NDPs 236 omit data portions. The DL NDPs 236 are illustrated in FIG. 2A as being transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO).

When transmitting the DL NDPs 236, the AP 114 records a time $t_{3,k}$ at which the AP 114 began transmitting the DL NDP 236. Similarly, when each client station 154 receives the corresponding DL NDP 236, the client station 154 records a time $t_{4,k}$ at which the client station 154 began receiving the DL NDP 236. As illustrated in FIG. 2B, the AP 114 records the time $t_{3,k}$ at which the AP 114 began transmitting the DL NDP 236, and the client station 154 records the time $t_{4,k}$ at which the client station 154 began receiving the DL NDP 236.

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station 154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

In an embodiment, the AP 114 transmits a DL PPDU 240 a defined time period after an end of the DL PPDU 232. In an embodiment, the defined time period is SIFS. In other embodiments, another suitable time period is utilized. The PPDU 240 includes a trigger frame to cause the group of client stations 154 to simultaneously transmit, as part of an UL MU transmission 244, uplink PPDUs 248 that include ranging measurement feedback. The trigger frame in the PPDU 240 causes multiple client stations 154 to begin simultaneously transmitting the UL MU transmission 244 a defined time period after an end of the PPDU 240. In an embodiment, the defined time period is SIFS. In other embodiments, another suitable time period is utilized.

The UL MU transmission 244 (which may be an UL OFDMA transmission or an UL MU-MIMO transmission) includes UL PPDUs 248 from multiple client stations 154, e.g., STA1, STA2, STA3, and STA4. The UL PPDUs 248 are illustrated in FIG. 2A as being transmitted in different frequency bandwidth portions. In some embodiments, two or more of the UL PPDUs 248 are transmitted within a same frequency band (e.g., two or more of the UL PPDUs 248 span the same frequency band) using different spatial streams (e.g., the two or more UL PPDUs 248 are transmitted using MU-MIMO).

The UL PPDUs 248 correspond to uplink ranging measurement feedback packets. The PPDUs 248 respectively include the recorded times $t_{1,k}$ and $t_{4,k}$. In some embodiments, each of one or more PPDUs 248 respectively includes the recorded angles $AoD_{1,k}$ and $AoA_{2,k}$. In some embodiments, the PPDUs 248 optionally also include respective channel estimate information determined by the client station 154 based on reception of the DL NDPs 236.

After receipt of the PPDUs 248, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

Responsive to receipt of the PPDUs 248, the AP 114 generates a DL PPDU 252 that includes one or more acknowledgment (ACK) frames 256, according to an embodiment. In an embodiment, the DL PPDU 252 is an MU transmission (e.g., OFDMA and/or MU MIMO) with respective ACK frames 256 for respective STAs. In another embodiment, the DL PPDU 252 includes a single ACK frame 256 that acknowledges receipt of multiple PPDUs 248 from multiple STAs. The AP 114 transmits the DL PPDU 252 a defined time period after an end of the UL transmission 244. In an embodiment, the defined time period is SIFS. In other embodiments, another suitable time period is utilized.

As will be described in more detail below, the AP 114 does not generate and transmit the DL PPDU 252 even when the AP 114 successfully receives the UL PPDUs 248, according to an embodiment. Thus, in some embodiments, the DL PPDU 252 is omitted from the procedure 200.

Figure 2C:
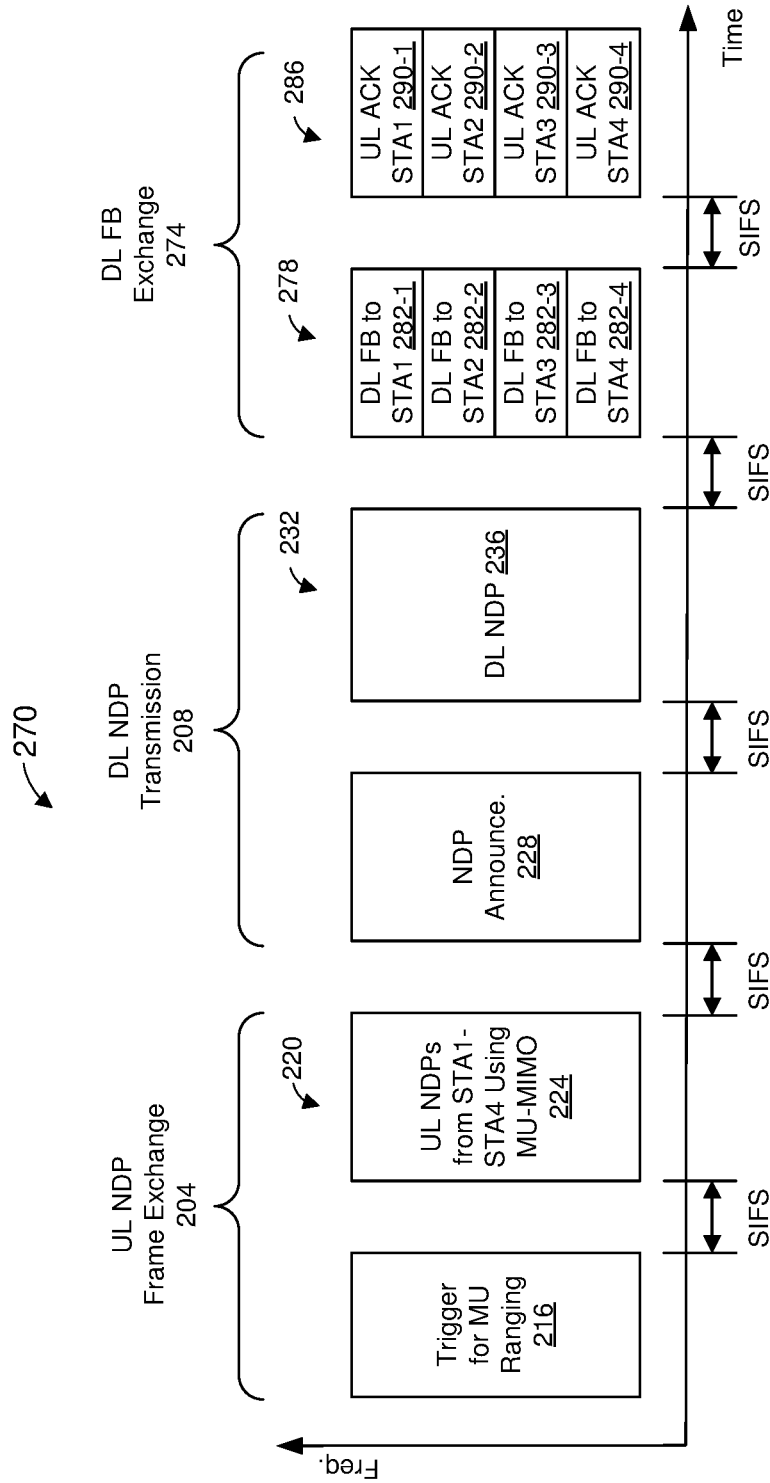
FIG. 2C is a diagram of another MU ranging measurement exchange in an MU ranging measurement procedure, according to another embodiment.

FIG. 2C is a diagram of another example MU ranging measurement exchange 270 in another MU ranging measurement procedure, according to an embodiment. The diagram 270 is described in the context of the example network 110 merely for explanatory purposes. In some embodiments, signals illustrated in FIG. 2C are generated by other suitable communication devices in other suitable types of wireless networks.

The MU ranging measurement exchange 270 corresponds to an AP-initiated MU ranging measurement exchange, according to an embodiment. The MU ranging measurement exchange 270 is similar to the MU ranging measurement exchange 200 of FIG. 2A, but the UL FB exchange 212 of FIG. 2A is replaced with a DL FB exchange 274. In an embodiment, the uplink UL NDP frame exchange 204, the DL NDP transmission portion 208, and the DL FB exchange 274 occur within a single TXOP. In another embodiment, the uplink UL NDP frame exchange 204, the DL NDP transmission portion 208, and the DL FB exchange 274 do not occur within a single TXOP.

The DL FB exchange 274 includes a DL PPDU 278 (which may be a DL OFDMA transmission or a DL MU-MIMO transmission) having FB frames 282 for multiple client stations 154, e.g., STA1, STA2, STA3, and STA4. The FB frames 282 are illustrated in FIG. 2C as being transmitted in different frequency bandwidth portions. In some embodiments, two or more of the FB frames 282 are transmitted within a same frequency band (e.g., two or more of the FB frames 282 span the same frequency band) using different spatial streams (e.g., the two or more FB frames 282 are transmitted using MU-MIMO).

The FB frames 282 respectively include the recorded times $t_{2,k}$ and $t_{3,k}$. In some embodiments, each of one or more FB frames 282 respectively includes the recorded angles $AoA_{1,k}$ and $AoD_{2,k}$. In some embodiments, the FB frames 282 optionally also include respective channel estimate information determined by the AP 114 based on reception of the UL NDPs 224.

After receipt of the FB frames 282, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated positions of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 282, the client station 154 generate an UL MU transmission 286 (which may be an UL OFDMA transmission or an UL MU MIMO transmission) that includes respective ACK frames 290 from respective client stations, according to an embodiment. The client station 154 transmit as part of the UL MU transmission 286 a defined time period after an end of the DL transmission 278. In an embodiment, the defined time period is SIFS. In other embodiments, another suitable time period is utilized.

Figure 2D:
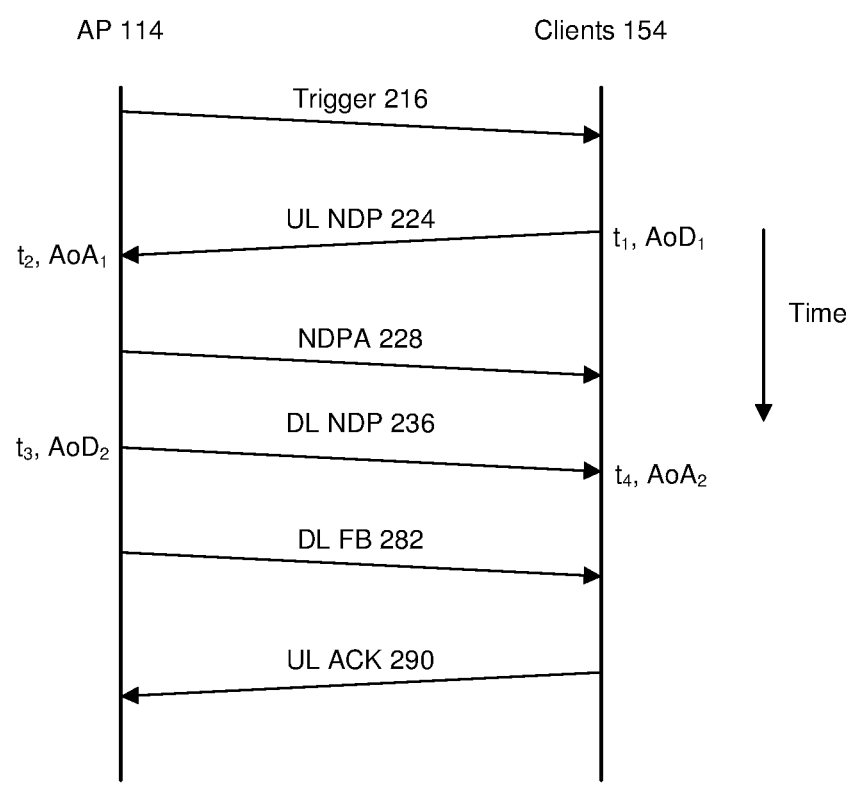
FIG. 2D is a timing diagram of the example MU ranging measurement exchange of FIG. 2C, according to an embodiment.

FIG. 2D is a timing diagram of the example MU ranging measurement exchange 270 of FIG. 2C.

In some embodiment, the MU ranging measurement exchange 200 of FIG. 2A and the MU ranging measurement exchange 270 of FIG. 2C are combined. For example, the DL FB exchange 274 of FIG. 2C is included in the MU ranging measurement exchange 200 of FIG. 2A after the UL FB exchange 212, according to an embodiment. As another example, the DL FB exchange 274 of FIG. 2C is included in the MU ranging measurement exchange 200 of FIG. 2A after the DL NDP transmission 208 and before the UL FB exchange 212, according to another embodiment.

Figure 2E:
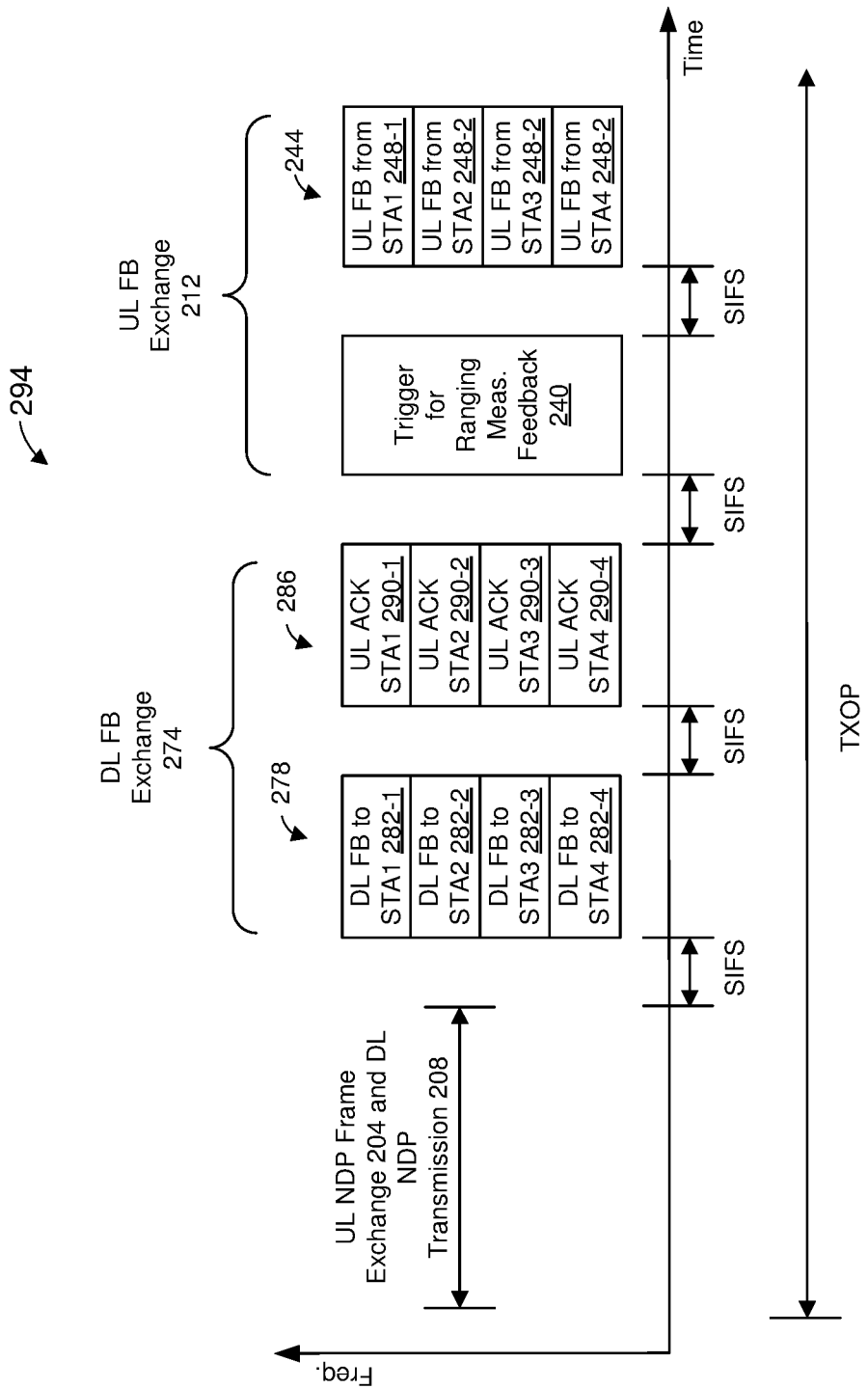
FIG. 2E is a diagram of another MU ranging measurement exchange in an MU ranging measurement procedure, according to an embodiment.

FIG. 2E is a diagram of another example MU ranging measurement exchange 294 in another MU ranging measurement procedure, according to an embodiment.

The MU ranging measurement exchange 294 corresponds to an AP-initiated MU ranging measurement exchange, according to an embodiment. The MU ranging measurement exchange 294 is similar to the MU ranging measurement exchange 270 of FIG. 2C, but further includes the UL FB exchange 212 of FIG. 2A after DL FB exchange 274. In an embodiment, the uplink UL NDP frame exchange 204, the DL NDP transmission portion 208, the DL FB exchange 274, and the UL FB exchange 212 occur within a single TXOP. In another embodiment, the uplink UL NDP frame exchange 204, the DL NDP transmission portion 208, the DL FB exchange 274, and the UL FB exchange 212 do not occur within a single TXOP.

Figure 3:
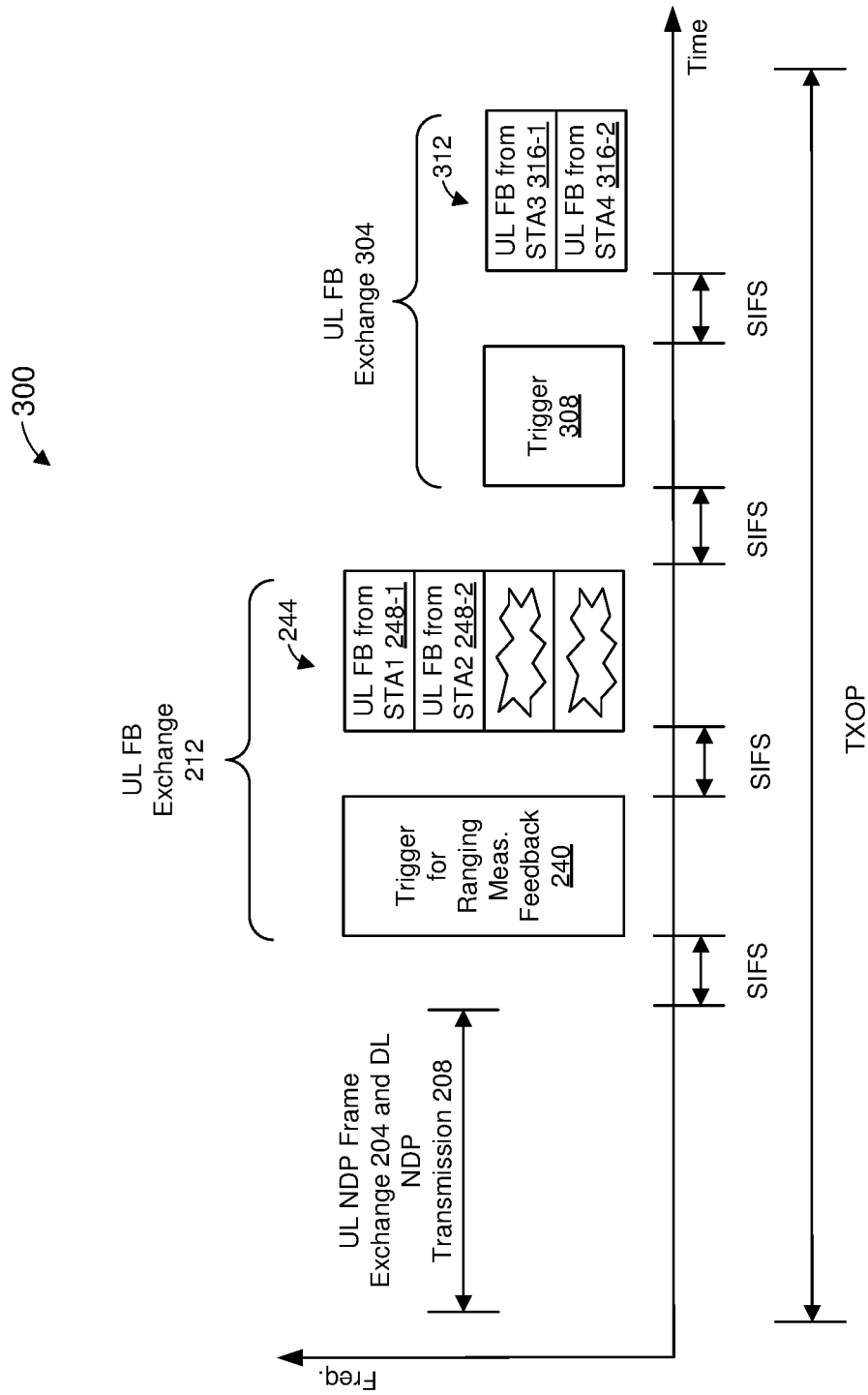
FIG. 3 is a diagram of another MU ranging measurement exchange in an MU ranging measurement procedure, according to another embodiment.

FIG. 3 is a diagram of another example MU ranging measurement exchange 300 in another MU ranging measurement procedure, according to an embodiment. The MU ranging measurement exchange 300 is described in the context of the example network 110 merely for explanatory purposes. In some embodiments, signals illustrated in FIG. 3 are generated by other suitable communication devices in other suitable types of wireless networks.

The MU ranging measurement exchange 300 corresponds to an AP-initiated MU ranging measurement exchange, according to an embodiment. The MU ranging measurement exchange 300 is similar to the MU ranging measurement exchange 200 of FIG. 2A, but the DL PPDU 252 (with ACKs 256) of FIG. 2A is omitted. In an embodiment, the uplink UL NDP frame exchange 204, the DL NDP transmission portion 208, and the DL FB exchange 274 occur within a single TXOP. In another embodiment, the uplink UL NDP frame exchange 204, the DL NDP transmission portion 208, and the DL FB exchange 274 do not occur within a single TXOP.

In the scenario illustrated in FIG. 3, the AP 114 correctly receives PPDU 248-1 from STA1 and PPDU 248-2 from STA2 as part of the UL MU transmission 244. In an embodiment, the AP 114 does not generate and transmit any ACK frame to STA1 or STA2 even when successfully receiving the UL PPDUs 3248 from STA1 and STA2.

In the scenario illustrated in FIG. 3, the AP 114 did not correctly receive PPDU 248-3 from STA3 and PPDU 248-4 from STA4 (as part of the UL MU transmission 244) due to, for example, a collision (e.g., interference). The AP 114 (e.g., the MAC processor 126) determines that FB from STA3 and STA4 was not successfully received in the UL MU transmission 244. In response, the AP 114 initiates a second UL FB exchange 304 by generating and transmitting a DL PPDU 308 a defined time period after an end of the UL MU transmission 244. In an embodiment, the defined time period is SIFS. In other embodiments, another suitable time period is utilized.

The PPDU 308 includes a trigger frame to cause the STA3 and STA4 to simultaneously transmit, as part of an UL MU transmission 312, uplink PPDUs 316 that include ranging measurement feedback. The trigger frame in the PPDU 308 is similar to the trigger frame in the PPDU 240, and causes STA3 and STA4 to begin simultaneously transmitting the UL MU transmission 312 a defined time period after an end of the PPDU 308. In an embodiment, the defined time period is SIFS. In other embodiments, another suitable time period is utilized.

The UL MU transmission 312 (which may be an UL OFDMA transmission or an UL MU-MIMO transmission) includes UL PPDUs 316 from STA3 and STA4. The UL PPDUs 316 are illustrated in FIG. 3 as being transmitted in different frequency bandwidth portions. In some embodiments, the UL PPDUs 316 are transmitted within a same frequency band (e.g., the UL PPDUs 316 span the same frequency band) using different spatial streams (e.g., the UL PPDUs 316 are transmitted using MU-MIMO).

The UL PPDUs 316 correspond to uplink ranging measurement feedback packets from STA3 and STA4. The PPDUs 316 respectively include the recorded times $t_{1,k}$ and $t_{4,k}$. In some embodiments, one or both of the PPDUs 316 respectively includes the recorded angles $AoD_{1,k}$ and $AoA_{2,k}$. In some embodiments, the PPDUs 316 optionally also include respective channel estimate information determined by STA3 and STA4 based on reception of the DL NDPs 236.

In an embodiment, the AP 114 does not generate and transmit any ACK frame to STA3 or STA4 even when successfully receiving the UL PPDUs 316 from STA3 and STA4.

In another embodiment, the MU ranging measurement exchange 300 further includes the DL FB exchange 274 prior to the UL FB exchange 212.

As discussed above, UL FB PPDUs 248 may include, in addition to recorded times $t_{1,k}$ and $t_{4,k}$, one or more of i) the recorded angles $AoD_{1,k}$, ii) the recorded angles $AoA_{2,k}$, and iii) channel estimate information determined by client stations 154 based on reception of the DL NDPs 236. In some embodiments, channel estimate information can be conveyed in different granularities. For example, in some embodiments, one respective channel measurement is provided for each OFDM tone, or one respective channel measurement is provided for each group of n OFDM tones, where n is an integer greater than one. Sending one respective channel measurement for each group of n OFDM tones requires less total channel estimate information to be conveyed across the wireless channel medium, as opposed to sending one respective channel measurement for each OFDM tone. In some embodiments, a channel measurement can be quantized to different numbers of bits. For instance, a channel measurement can be represented using m bits, where m is a positive integer chosen from a suitable set of different positive integers corresponding to different quantization granularities. Sending channel measurements that are each represented using m bits requires less total channel estimate information to be conveyed across the wireless channel medium, as opposed to sending channel measurements that are each represented using m+2 bits, for example. Thus, different granularities channel estimate information correspond to different value(s) of one or both of n and m, according to an embodiment.

In some embodiments, the AP 114 (e.g., the MAC processor 126) determines that one or more client stations 154 are to include, in one or more of the UL FB PPDUs 248/316, one or more of i) recorded angle(s) $AoD_{1,k}$, ii) recorded angle(s) $AoA_{2,k}$, and iii) channel estimate information determined by client station(s) 154 based on reception of the DL NDPs 236. In some embodiments, the AP 114 (e.g., the MAC processor 126) determines the granularity(ies) of channel estimate information to be included in one or more of the UL FB PPDUs 248/316. In some embodiments, the AP 114 (e.g., the MAC processor 126) generates one or more MAC frames that include information configured to cause one or more of the client stations 154 to include, in one or more of the UL FB PPDUs 248/316, one or more of i) recorded angle(s) $AoD_{1,k}$, ii) recorded angle(s) $AoA_{2,k}$, and iii) channel estimate information determined by client station(s) 154 based on reception of the DL NDPs 236. In some embodiments, contents of the sounding feedback, e.g., time stamp(s), AoA, AoD, channel estimation information, etc., is decided during an NDP sounding negotiation that occurs prior to the MU ranging measurement exchange 300. In some embodiments, contents of the sounding feedback is specified in a trigger frame (e.g., trigger frame 216, 240 and/or 308) or an NDP Announcement frame (e.g., NDPA 228). If the one or more of the client stations 154 are to include, in one or more of the UL FB PPDUs 248/316, channel estimate information, the one or more MAC frames may include information that indicates the granularity(ies) of the channel estimate information to be included in one or more of the UL FB PPDUs 248/316, according to some embodiments. The AP 114 then transmits the one or more MAC frames prior to the MU ranging measurement exchange 200/300. In some embodiments, granularity(ies) of the channel estimation information is decided during an NDP sounding negotiation that occurs prior to the MU ranging measurement exchange 300. In some embodiments, granularity(ies) of the channel estimation information is specified in a trigger frame (e.g., trigger frame 216, 240 and/or 308) or an NDP Announcement frame (e.g., NDPA 228).

In some embodiments, the AP 114 (e.g., the MAC processor 126) generates one or more MAC frames that include information indicating channel resources (e.g., channel frequency bandwidth, spatial streams, etc.) allocated to the client stations 154 for transmitting the UL FB PPDUs 248/316. In some embodiments, the AP 114 (e.g., the MAC processor 126) allocates channel resources to the client stations 154 so that the client station 154 can include the determined information (e.g., a recorded angle $AoD_{1,k}$, a recorded angle $AoA_{2,k}$, channel estimate information, channel estimate information at a particular granularity, etc.) in the UL FB PPDUs 248/316, given the channel resources (e.g., channel frequency bandwidth, spatial streams, etc.) allocated to the client stations 154. The AP 114 then transmits the one or more MAC frames prior to the MU ranging measurement exchange 200/300. In some embodiments, the AP 114 (e.g., the MAC processor 126) includes the information indicating channel resources (e.g., channel frequency bandwidth, spatial streams, etc.) allocated to the client stations 154 for transmitting the UL FB PPDUs 248/316 in the trigger frame 216, the NDPA 228, the trigger frame 240, and/or the trigger frame 308.

In some embodiments, the AP is configured to allocate sufficient channel medium resources for a client station 154 to report the ranging feedback. In some embodiments, a client station 154 (e.g., the MAC processor 166) determines whether the information (e.g., a recorded angle $AoD_{1,k}$, a recorded angle $AoA_{2,k}$, channel estimate information, channel estimate information at a particular granularity, etc.) requested by the AP 114 can be included within a single UL FB PPDU 248/316 given the channel resources (e.g., channel frequency bandwidth, spatial streams, etc.) allocated to the client station 154 by the AP 114. When the client station 154 (e.g., the MAC processor 166) determines that the information (e.g., a recorded angle $AoD_{1,k}$, a recorded angle $AoA_{2,k}$, channel estimate information, channel estimate information at a particular granularity, etc.) requested by the AP 114 cannot be included within a single UL FB PPDU 248/316 given the channel resources (e.g., channel frequency bandwidth, spatial streams, etc.) allocated to the client station 154 by the AP 114, the client station 154 (e.g., the MAC processor 166) generates a MAC frame (e.g., a quality of service (QoS) null frame or another suitable MAC frame) to request additional channel resources (e.g., more channel frequency bandwidth, one or more additional spatial streams, etc.) for transmitting the UL FB PPDU 248/316, and the client station 154 transmits the MAC frame prior to the MU ranging measurement exchange 200/300, according to an embodiment. When the client station 154 (e.g., the MAC processor 166) determines that the information (e.g., a recorded angle $AoD_{1,k}$, a recorded angle $AoA_{2,k}$, channel estimate information, channel estimate information at a particular granularity, etc.) requested by the AP 114 cannot be included within a single UL FB PPDU 248/316 given the channel resources (e.g., channel frequency bandwidth, spatial streams, etc.) allocated to the client station 154 by the AP 114, the client station 154 (e.g., the MAC processor 166) determines that the requested information is to be fragmented across multiple UL PPDUs such that only subset of the requested information is included in the UL FB PPDU 248/316, according to an embodiment.

In some embodiments, the client station 154 (e.g., the MAC processor 166) determines (e.g., via negotiation with the AP 114, as specified by the NDPA 228 and/or the DL Trigger frame for MU Ranging 216, etc.) whether the client station 154 is to include, in the UL FB PPDUs 248/316, one or more of i) recorded angle(s) $AoD_{1,k}$, ii) recorded angle(s) $AoA_{2,k}$, and iii) channel estimate information determined by client station 154 based on reception of the DL NDP 236. In some embodiments, the client station 154 (e.g., the MAC processor 166) determines the granularity of channel estimate information to be included in the UL FB PPDUs 248/316. In some embodiments, the client station 154 (e.g., the MAC processor 166) determines whether the client station 154 is to include, in the UL FB PPDUs 248/316, one or more of i) recorded angle(s) $AoD_{1,k}$, ii) recorded angle(s) $AoA_{2,k}$, iii) channel estimate information, and/or iv) the granularity of the channel estimate information so that the determined information can be included in the UL FB PPDUs 248/316, given the channel resources (e.g., channel frequency bandwidth, spatial streams, etc.) allocated to the client station 154 by the AP 114.

In some embodiments, the AP 114 and the client station 154 negotiate whether the client station 154 is to include, in the UL FB PPDUs 248/316, one or more of i) recorded angle(s) $AoD_{1,k}$, ii) recorded angle(s) $AoA_{2,k}$, iii) channel estimate information, and/or iv) the granularity of the channel estimate information prior to the MU ranging measurement exchange 200/300. For example, in an embodiment, negotiating includes the AP 114 (e.g., the MAC processor 126) generating one or more MAC frames (e.g., one or more NDP ranging negotiation response frames) with information indicating requested types of information to be included and/or requested granularities, and the AP 114 transmits the one or more MAC frames to the client station 154 prior to the MU ranging measurement exchange 200/300. Similarly, in an embodiment, negotiating includes the client station 154 (e.g., the MAC processor 166) generating one or more MAC frames (e.g., one or more NDP ranging negotiation request frames) with information indicating proposed types of information to be included and/or requested granularities, and the client station 154 transmits the one or more MAC frames to the AP 114 prior to the MU ranging measurement exchange 200/300. In some embodiment, the client station 154 generates one or more MAC frames (e.g., one or more NDP ranging negotiation request frames) with information indicating its supported type(s) and/or granularity(ies), and the AP 114 selects, from the supported type(s) and/or granularity(ies), a type and/or a granularity for the STA to report its measurement feedback, and transmits one or more MAC frames (e.g., NDP ranging negotiation response frames) with the selected type and/or a granularity.

Figure 4:
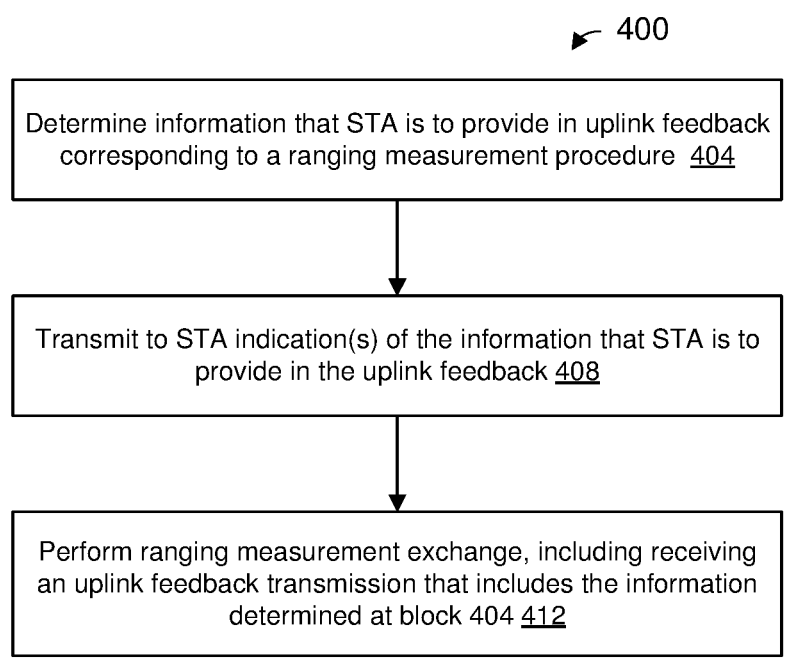
FIG. 4 is a flow diagram of an example method for performing an MU range measurement exchange, according to an embodiment.

FIG. 4 is a flow diagram of an example method 400 for performing a ranging measurement exchange, according to an embodiment. In some embodiments, the network interface device 122 of FIG. 1 is configured to implement the method 400. The method 400 is described in the context of the network interface device 122 merely for explanatory purposes and, in other embodiments, the method 400 is implemented by another suitable communication device. Additionally, the method 400 is described in the context of the ranging exchange 200 of FIG. 2A merely for explanatory purposes and, in other embodiments, the method 400 is implemented in connection with other suitable ranging exchanges.

At block 404, a first communication device determines (e.g., the network interface device 122 determines, e.g., the MAC processor 126 of the network interface device 122 determines; etc.) information that a second communication device (e.g., the client station 154-1) is to provide in an uplink feedback transmission (e.g., the UL FB PPDU 248/316) to the first communication device, wherein the uplink feedback transmission is a part of the ranging measurement exchange. In an embodiment, the MAC processor 126 determines whether the client station 154 is to include, in the UL FB PPDU 248/316, one or more of i) the recorded angle $AoD_{1,k}$, ii) the recorded angle $AoA_{2,k}$, iii) channel estimate information, and/or iv) the granularity of the channel estimate information.

In some embodiments, block 404 comprises the first communication device determining the information that the second communication device is to provide in the uplink feedback transmission without negotiating with the second communication device regarding which information (and/or, if the information includes channel estimate information, a granularity of the channel estimate information) the second communication device is to provide in the uplink feedback transmission. In other embodiments, block 404 comprises the first communication device negotiating with the second communication device regarding which information (and/or, if the information includes channel estimate information, a granularity of the channel estimate information) the second communication device is to provide in the uplink feedback transmission.

At block 408, the first communication device transmits (e.g., the network interface device 122 transmits, etc.) to the second communication device an indication or indications of the information determined at block 404. In an embodiment, the network interface device 122 includes an indication or indications of the information determined at block 404 in the trigger frame 216 (FIG. 2A). In an embodiment, the network interface device 122 includes an indication or indications of the information determined at block 404 in the NDPA 228 (FIG. 2A). In an embodiment, the network interface device 122 includes an indication or indications of the information determined at block 404 in the trigger frame 240 (FIG. 2A). In an embodiment, the network interface device 122 includes an indication or indications of the information determined at block 404 in a PPDU transmitted prior to the ranging measurement exchange 200, e.g., in one or more NDP ranging negotiation response frames or one or more NDP ranging negotiation request frames.

At block 412, the first communication device performs the ranging measurement exchange with the second communication device. Block 412 includes the first communication device receiving, in an uplink feedback transmission from the second communication device, wherein the uplink feedback transmission includes the information determined at block 404. In an embodiment, block 412 includes performing the downlink transmissions discussed with respect to FIG. 2A, and receiving the uplink transmissions discussed with respect to FIG. 2A. In an embodiment, block 412 includes receiving the information determined at block 404 in an UL FB PPDU 248.

In an embodiment, the method 400 is performed for a group of second communication devices (e.g., client stations). For example, the determination of block 404 is performed for a group of client stations, the indication(s) transmitted at block 408 are transmitted to the group of communication devices, and the determined information is received in an UL MU transmission, such as the UL MU transmission 244 (FIG. 2A).

Figure 5:
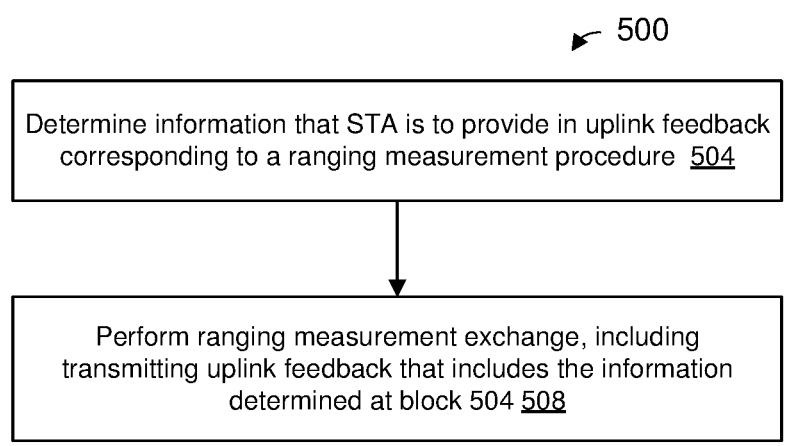
FIG. 5 is a flow diagram of another example method for performing an MU range measurement exchange, according to another embodiment.

FIG. 5 is a flow diagram of another example method 500 for performing a ranging measurement exchange, according to an embodiment. In some embodiments, the network interface device 162 of FIG. 1 is configured to implement the method 500. The method 500 is described in the context of the network interface device 162 merely for explanatory purposes and, in other embodiments, the method 500 is implemented by another suitable communication device. Additionally, the method 500 is described in the context of the ranging exchange 200 of FIG. 2A merely for explanatory purposes and, in other embodiments, the method 500 is implemented in connection with other suitable ranging exchanges.

At block 504, a first communication device determines (e.g., the network interface device 162 determines, e.g., the MAC processor 166 of the network interface device 162 determines; etc.) information that the first communication device is to provide in an uplink feedback transmission (e.g., the UL FB PPDU 248/316) to a second communication device (e.g., the AP 114), wherein the uplink feedback transmission is a part of the ranging measurement exchange. In an embodiment, the MAC processor 166 determines whether the UL FB PPDU 248/316 is to include one or more of i) the recorded angle $AoD_{1,k}$, ii) the recorded angle $AoA_{2,k}$, iii) channel estimate information, and/or iv) the granularity of the channel estimate information.

In some embodiments, block 504 comprises the first communication device determining the information that is to be provided in the uplink feedback transmission without being instructed by, and without negotiating with, the second communication device regarding which information (and/or, if the information includes channel estimate information, a granularity of the channel estimate information) is to be provided in the uplink feedback transmission.

In another embodiment, the method 500 is performed in conjunction with the method 400, and block 504 comprises receiving a transmission from the second communication device (e.g., corresponding to the transmission of block 408 of FIG. 4), where the transmission includes an indication(s) of which information (and/or, if the information includes channel estimate information, a granularity of the channel estimate information) is to be provided in the uplink feedback transmission. In various embodiments, the received transmission is the trigger 216, the NDPA 228, the trigger 240, or a transmission prior to the ranging measurement exchange 200. In another embodiment, the method 500 is performed in conjunction with the method 400, and block 504 comprises negotiating with the second communication device regarding which information (and/or, if the information includes channel estimate information, a granularity of the channel estimate information) is to be provided in the uplink feedback transmission.

At block 508, the first communication device performs the ranging measurement exchange with the second communication device. Block 508 includes the first communication device transmitting, in an uplink feedback transmission, the information determined at block 504. In an embodiment, block 508 includes performing the uplink transmissions discussed with respect to FIG. 2A, and receiving the downlink transmissions discussed with respect to FIG. 2A. In an embodiment, block 508 includes transmitting the information determined at block 504 in an UL FB PPDU 248.

Referring again to FIG. 2A, one or more client stations will need more time to prepare the feedback information included in one or more respective UL FB PPDUs 248 than is provided by the example sequence illustrated in FIG. 2A, in some embodiments. Thus, in some embodiments, the UL NDP frame exchange 204 and the DL NDP transmission portion 208 are performed during a first TXOP, and the UL FB exchange 212 is performed during a separate second TXOP. In an embodiment, the network interface device 122 determines (e.g., the MAC processor 126 determines) an earliest start time of the second TXOP such that client stations 154 that will participate in the UL MU transmission 244 will have sufficient time to prepare the feedback information to be included in the UL MU transmission 244. In an embodiment, client stations 154 report (e.g., transmit to the AP 114) respective times required by the client stations 154 to prepare the feedback information to be included in the UL MU transmission 244, and the AP 114 (e.g., the MAC processor 126) uses the reported times to determine an earliest start time of the second TXOP such that client stations 154 that will participate in the UL MU transmission 244 will have sufficient time to prepare the feedback information to be included in the UL MU transmission 244. In an embodiment, the network interface device 122 determines (e.g., the MAC processor 126 determines) an earliest transmission time of the trigger frame 240 during the second TXOP such that client stations 154 that will participate in the UL MU transmission 244 will have sufficient time to prepare the feedback information to be included in the UL MU transmission 244. In an embodiment, client stations 154 report (e.g., transmit to the AP 114) respective times required by the client stations 154 to prepare the feedback information to be included in the UL MU transmission 244, and the AP 114 (e.g., the MAC processor 126 determines) uses the reported times to determine an earliest transmit time of the trigger frame 240 such that client stations 154 that will participate in the UL MU transmission 244 will have sufficient time to prepare the feedback information to be included in the UL MU transmission 244.

In an embodiment, client stations 154 report (e.g., transmit to the AP 114) respective times required by the client stations 154 to prepare the feedback information to be included in the UL MU transmission 244 in a capabilities information element included in a MAC frame such as an association request frame, a reassociation request frame, an NDP negotiation request frame, an NDP negotiation response frame, etc. In an embodiment, the capabilities information element includes a field for reporting a times required by a station to prepare the feedback information to be included in a PPDU related to UL ranging measurement feedback.

In an embodiment, the AP 114 determines (e.g., the MAC processor 126 determines) a maximum time among the respective times required by the client stations 154 to prepare the feedback information to be included in the UL MU transmission 244, and the AP 114 uses (e.g., the MAC processor 126 uses) the maximum time to determine an earliest start time of the second TXOP and/or an earliest transmission time of the trigger frame 240. The AP 114 then determines (e.g., the MAC processor 126 determines) when to initiate transmission of the trigger frame 240 based on the determined earliest start time of the second TXOP and/or the earliest transmission time of the trigger frame 240.

Figure 6:
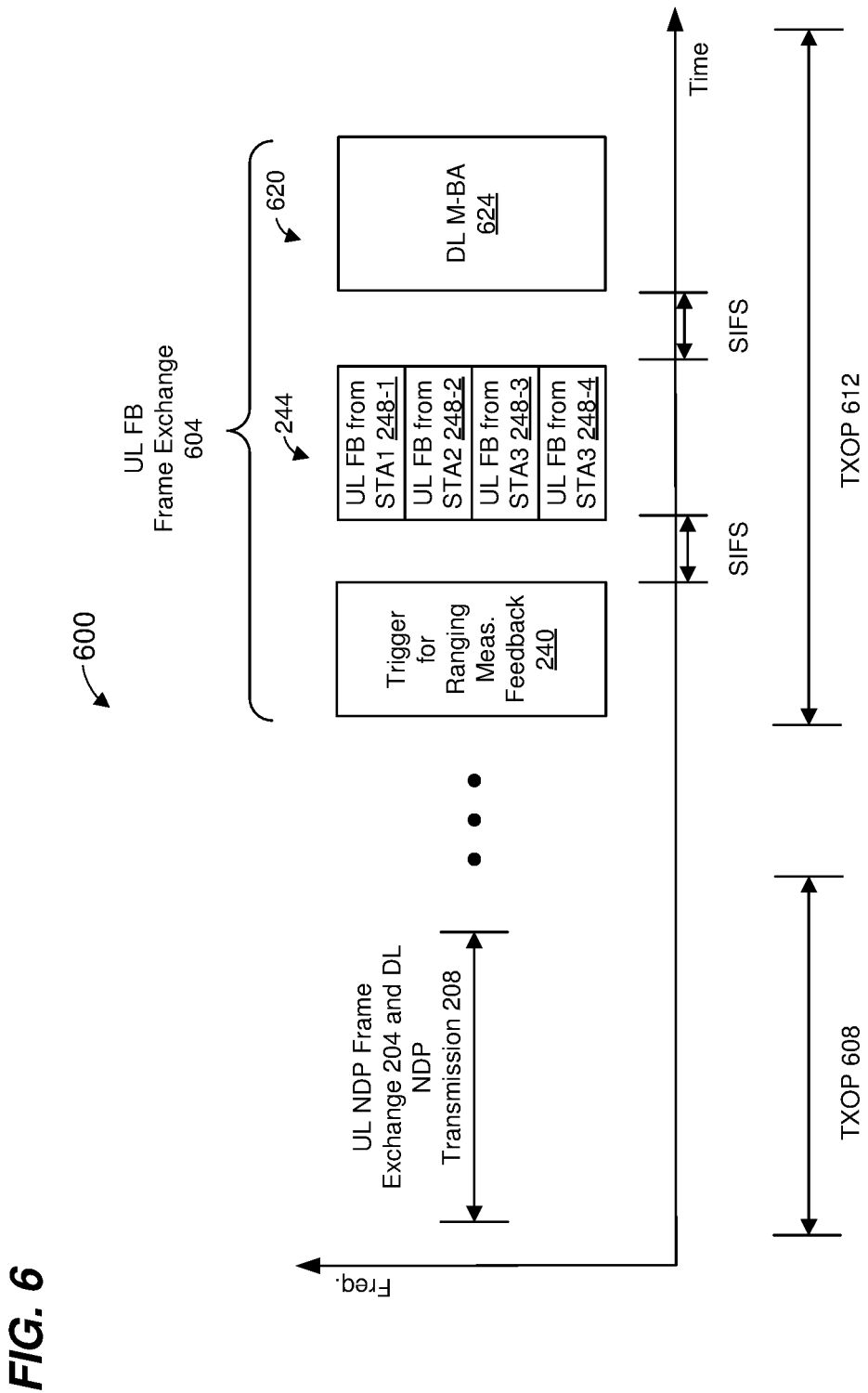
FIG. 6 is a diagram of another MU ranging measurement exchange in an MU ranging measurement procedure, according to another embodiment.

FIG. 6 is a diagram of another example MU ranging measurement exchange 600 in another MU ranging measurement procedure, according to an embodiment. The MU ranging measurement exchange 600 is described in the context of the example network 110 merely for explanatory purposes. In some embodiments, signals illustrated in FIG. 6 are generated by other suitable communication devices in other suitable types of wireless networks.

The MU ranging measurement exchange 600 corresponds to an AP-initiated MU ranging measurement exchange, according to an embodiment. The MU ranging measurement exchange 600 is similar to the MU ranging measurement exchange 200 of FIG. 2A, but an UL FB frame exchange 604 does not begin SIFS after the DL MU transmission 232 as in the MU ranging measurement exchange 200 of FIG. 2A. In an embodiment, the uplink UL NDP frame exchange 204 and the DL NDP transmission portion 208 occur within a first TXOP 608, whereas the UL FB frame exchange 604 occurs within a second TXOP 612.

Responsive to receipt of the UL FB PPDUs 248, the AP 114 generates and transmits a DL PPDU 620 that includes an MU block acknowledgment (M-BA) frame 624 that acknowledges the PPDUs 248, according to an embodiment. In another embodiment, the DL PPDU 620 is an MU transmission (e.g., OFDMA and/or MU MIMO) with respective ACK frames for respective STAs. In another embodiment, the DL PPDU 620 includes a single ACK frame that acknowledges receipt of multiple PPDUs 248 from multiple STAs. The AP 114 transmits the DL PPDU 252 a defined time period after an end of the UL transmission 244. In an embodiment, the defined time period is SIFS. In other embodiments, another suitable time period is utilized.

In some embodiments, the AP 114 does not generate and transmit the DL PPDU 620 even when the AP 114 successfully receives the UL PPDUs 248, according to an embodiment. Thus, in some embodiments, the DL PPDU 620 is omitted from the procedure 600.

In an embodiment, the network interface device 122 determines (e.g., the MAC processor 126 determines) a start time of the second TXOP 612 such that client stations 154 that will participate in the UL MU transmission 244 will have sufficient time to prepare the feedback information to be included in the UL MU transmission 244. In an embodiment, the network interface device 122 determines (e.g., the MAC processor 126 determines) a transmission time of the trigger 240 during the second TXOP 612 such that client stations 154 that will participate in the UL MU transmission 244 will have sufficient time to prepare the feedback information to be included in the UL MU transmission 244.

In an embodiment, the network interface device 122 determines (e.g., the MAC processor 126 determines) a delay period after the DL NDP transmission 208 such that client stations 154 that will participate in the UL MU transmission 244 will have sufficient time to prepare the feedback information to be included in the UL MU transmission 244. In an embodiment, the AP 114 determines (e.g., the MAC processor 126 determines) a maximum time among the respective times required by the client stations 154 to prepare the feedback information to be included in the UL MU transmission 244, and the AP 114 uses (e.g., the MAC processor 126 uses) the maximum time to determine the delay period. The AP 114 then determines (e.g., the MAC processor 126 determines) when to initiate transmission of the trigger frame 240 based on the determined delay period.

In another embodiment, the MU ranging measurement exchange 600 further includes, in the TXOP 612, the DL FB exchange 274 prior to the UL FB exchange 604.

In some embodiments, another UL FB exchange (not shown) occurs during the TXOP 608, after the uplink UL NDP frame exchange 204 and the DL NDP transmission portion 208, but the feedback provided in the other UL FB exchange is for a previous ranging measurement exchange (not shown) that occurred prior to the UL NDP frame exchange 204 and the DL NDP transmission portion 208 in the TXOP 608.

Referring again to FIG. 2A, the UL NDP frame exchange 204, the DL NDP transmission portion 208, and the UL FB exchange 212 are performed during a single TXOP, but a delay between the DL NDP transmission portion 208 and the UL FB exchange 212 is provided so that the client stations 154 have more time to prepare feedback information to be included in the UL MU transmission 244, according to an embodiment.

Referring now to FIGS. 2A and 6, in another embodiment, the UL FB exchange 212 occurs in the TXOP 608, but includes feedback information for a previous ranging measurement exchange (not shown) that occurred prior to the UL NDP frame exchange 204 and the DL NDP transmission portion 208.

Figure 7:
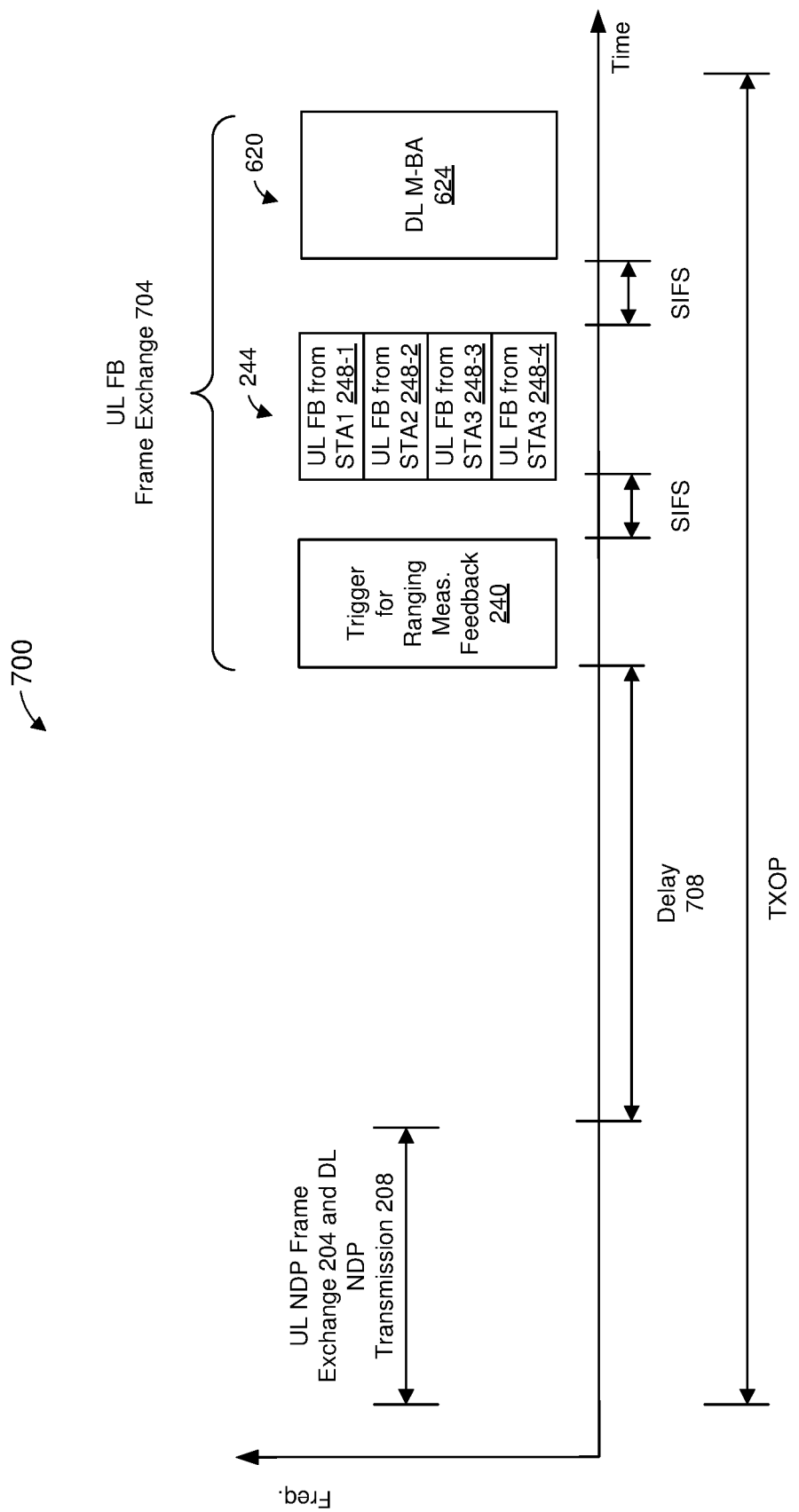
FIG. 7 is a diagram of another MU ranging measurement exchange in an MU ranging measurement procedure, according to another embodiment.

FIG. 7 is a diagram of another example MU ranging measurement exchange 700 in another MU ranging measurement procedure, according to an embodiment. The MU ranging measurement exchange 700 is described in the context of the example network 110 merely for explanatory purposes. In some embodiments, signals illustrated in FIG.

7 are generated by other suitable communication devices in other suitable types of wireless networks.

The MU ranging measurement exchange 700 corresponds to an AP-initiated MU ranging measurement exchange, according to an embodiment. The MU ranging measurement exchange 700 is similar to the MU ranging measurement exchange 200 of FIG. 2A, but an UL FB frame exchange 704 does not begin SIFS after the DL MU transmission 232 as in the MU ranging measurement exchange 200 of FIG. 2A. In an embodiment, the UL FB frame exchange 704 occurs after a delay period 708 after an end of the DL NDP transmission 208.

In an embodiment, the network interface device 122 determines (e.g., the MAC processor 126 determines) the delay period 708 such that client stations 154 that will participate in the UL MU transmission 244 will have sufficient time to prepare the feedback information to be included in the UL MU transmission 244. In an embodiment, the AP 114 determines (e.g., the MAC processor 126 determines) a maximum time among the respective times required by the client stations 154 to prepare the feedback information to be included in the UL MU transmission 244, and the AP 114 uses (e.g., the MAC processor 126 uses) the maximum time to determine the delay period 708.

In an embodiment, the network interface device 122 transmits a PPDU that is not related to the MU ranging measurement exchange 700 during the delay period 708 if the delay period 708 is sufficient to transmit the PPDU (and to receive an acknowledgment of the PPDU if the acknowledgment of the PPDU is required). In an embodiment, the network interface device 122 transmits a PPDU that includes a MAC data frame, a MAC management frame, an MAC control frame, etc., to one of the client station 154 participating in the MU ranging measurement exchange 700. In an embodiment, the network interface device 122 transmits a PPDU that includes a MAC data frame, a MAC management frame, an MAC control frame, etc., to a client station 154 that is not participating in the MU ranging measurement exchange 700. In an embodiment, the network interface device 122 transmits a PPDU that is part of an MU ranging measurement exchange with another group of client stations that are not participating in the MU ranging measurement exchange 700.

In another embodiment, the MU ranging measurement exchange 700 further includes, after the delay period 708, the DL FB exchange 274 prior to the UL FB exchange 604.

Referring again to FIG. 2C, the AP 114 will need more time to prepare the feedback information included in DL FB PPDUs 282 than is provided by the example sequence illustrated in FIG. 2C, in some scenarios and/or embodiments. Thus, in some embodiments, the UL NDP frame exchange 204 and the DL NDP transmission portion 208 are performed during a first TXOP, and the DL FB exchange 274 is performed during a separate second TXOP. In an embodiment, the network interface device 122 determines (e.g., the MAC processor 126 determines) an earliest start time of the second TXOP such that the AP 114 will have sufficient time to prepare the feedback information to be included in the DL MU transmission 278. In an embodiment, the network interface device 122 determines (e.g., the MAC processor 126 determines) an earliest transmission time of the DL MU transmission 278 during the second TXOP such that the AP 114 will have sufficient time to prepare the feedback information to be included in the DL MU transmission 278.

In an embodiment, the network interface device 122 determines (e.g., the MAC processor 126 determines) a delay period after the DL NDP transmission 208 such that the AP 114 will have sufficient time to prepare the feedback information to be included in the DL MU transmission 278. The AP 114 then determines (e.g., the MAC processor 126 determines) when to initiate transmission of the DL MU transmission 278 based on the determined delay period.

Figure 8:
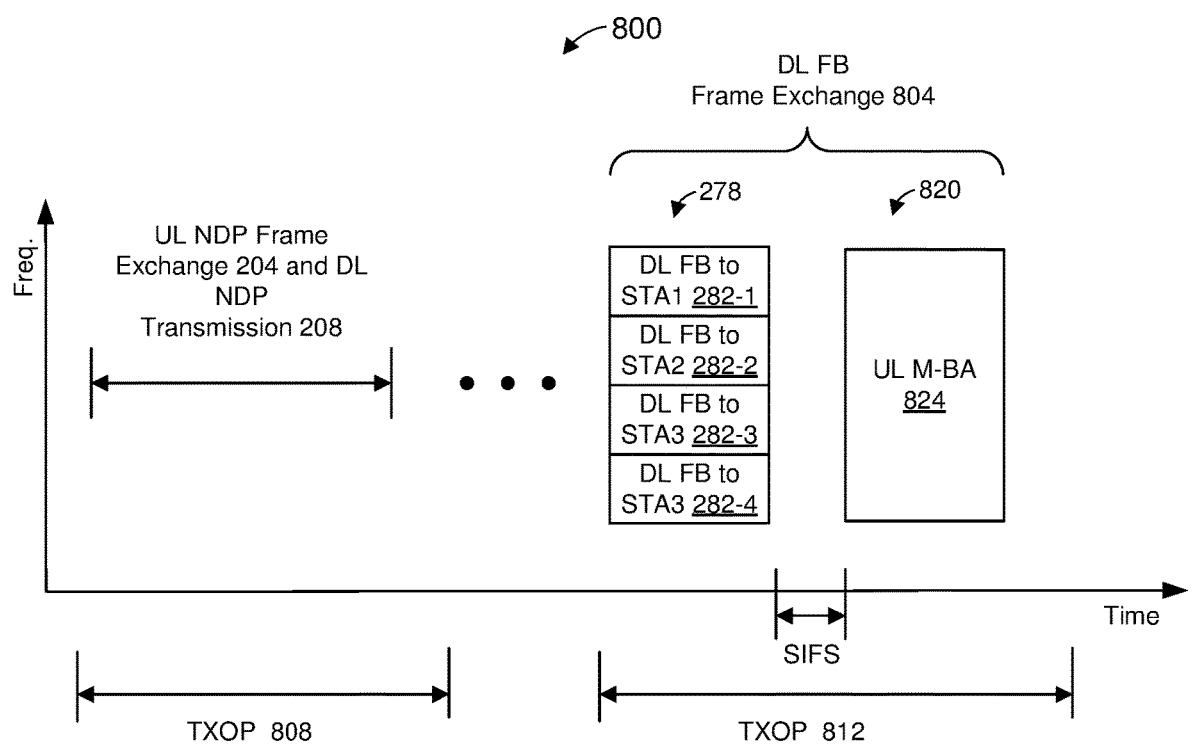
FIG. 8 is a diagram of another MU ranging measurement exchange in an MU ranging measurement procedure, according to another embodiment.

FIG. 8 is a diagram of another example MU ranging measurement exchange 800 in another MU ranging measurement procedure, according to an embodiment. The MU ranging measurement exchange 800 is described in the context of the example network 110 merely for explanatory purposes. In some embodiments, signals illustrated in FIG. 8 are generated by other suitable communication devices in other suitable types of wireless networks.

The MU ranging measurement exchange 800 corresponds to an AP-initiated MU ranging measurement exchange, according to an embodiment. The MU ranging measurement exchange 800 is similar to the MU ranging measurement exchange 270 of FIG. 2C, but a DL FB frame exchange 804 does not begin SIFS after the DL MU transmission 232 as in the MU ranging measurement exchange 270 of FIG. 2C. In an embodiment, the UL NDP frame exchange 204 and the DL NDP transmission portion 208 occur within a first TXOP 808, whereas the DL FB frame exchange 804 occurs within a second TXOP 812.

Responsive to receipt of the DL FB PPDUs 278, the client stations transmit an UL MU transmission 820 that includes an MU block acknowledgment (M-BA) frame 824 that acknowledges the PPDUs 282, according to an embodiment. In another embodiment, the UL MU transmission 820 is an MU transmission (e.g., OFDMA and/or MU MIMO) with respective ACK frames from respective STAs. The client stations 154 transmit the UL MU transmission 820 a defined time period after an end of the DL transmission 278. In an embodiment, the defined time period is SIFS. In other embodiments, another suitable time period is utilized.

In some embodiments, the client station 154 do not transmit the UL MU transmission 820 even when the client station 154 successfully receives the DL PPDUs 282, according to an embodiment. Thus, in some embodiments, the UL MU transmission 820 is omitted from the procedure 800.

In another embodiment, the MU ranging measurement exchange 800 further includes, in the TXOP 812, the UL FB exchange 212 after the DL FB exchange 804.

In some embodiments, another UL FB exchange (not shown) occurs during the TXOP 808, after the uplink UL NDP frame exchange 204 and the DL NDP transmission portion 208, but the feedback provided in the other UL FB exchange is for a previous ranging measurement exchange (not shown) that occurred prior to the UL NDP frame exchange 204 and the DL NDP transmission portion 208 in the TXOP 808.

In an embodiment, the network interface device 122 determines (e.g., the MAC processor 126 determines) a start time of the second TXOP 812 such that the network interface device 122 will have sufficient time to prepare the feedback information to be included in the DL MU transmission 278. In an embodiment, the network interface device 122 determines (e.g., the MAC processor 126 determines) a transmission time of the DL MU transmission 278 during the second TXOP 612 such that the network interface device 122 will have sufficient time to prepare the feedback information to be included in the DL MU transmission 278.

In an embodiment, the network interface device 122 determines (e.g., the MAC processor 126 determines) a delay period after the DL NDP transmission 208 such that the AP 114 will have sufficient time to prepare the feedback information to be included in the DL MU transmission 278. The AP 114 then determines (e.g., the MAC processor 126 determines) when to initiate transmission of the DL MU transmission 278 based on the determined delay period.

Referring again to FIG. 2C, the UL NDP frame exchange 204, the DL NDP transmission portion 208, and the DL FB exchange 274 are performed during a single TXOP, but a delay between the DL NDP transmission portion 208 and the DL FB exchange 274 is provided so that the network interface device 122 has more time to prepare feedback information to be included in the DL MU transmission 278, according to an embodiment.

Referring now to FIGS. 2C and 8, in another embodiment, the DL FB exchange 274 occurs in the TXOP 808, but includes feedback information for a previous ranging measurement exchange (not shown) that occurred prior to the UL NDP frame exchange 204 and the DL NDP transmission portion 208.

Figure 9:
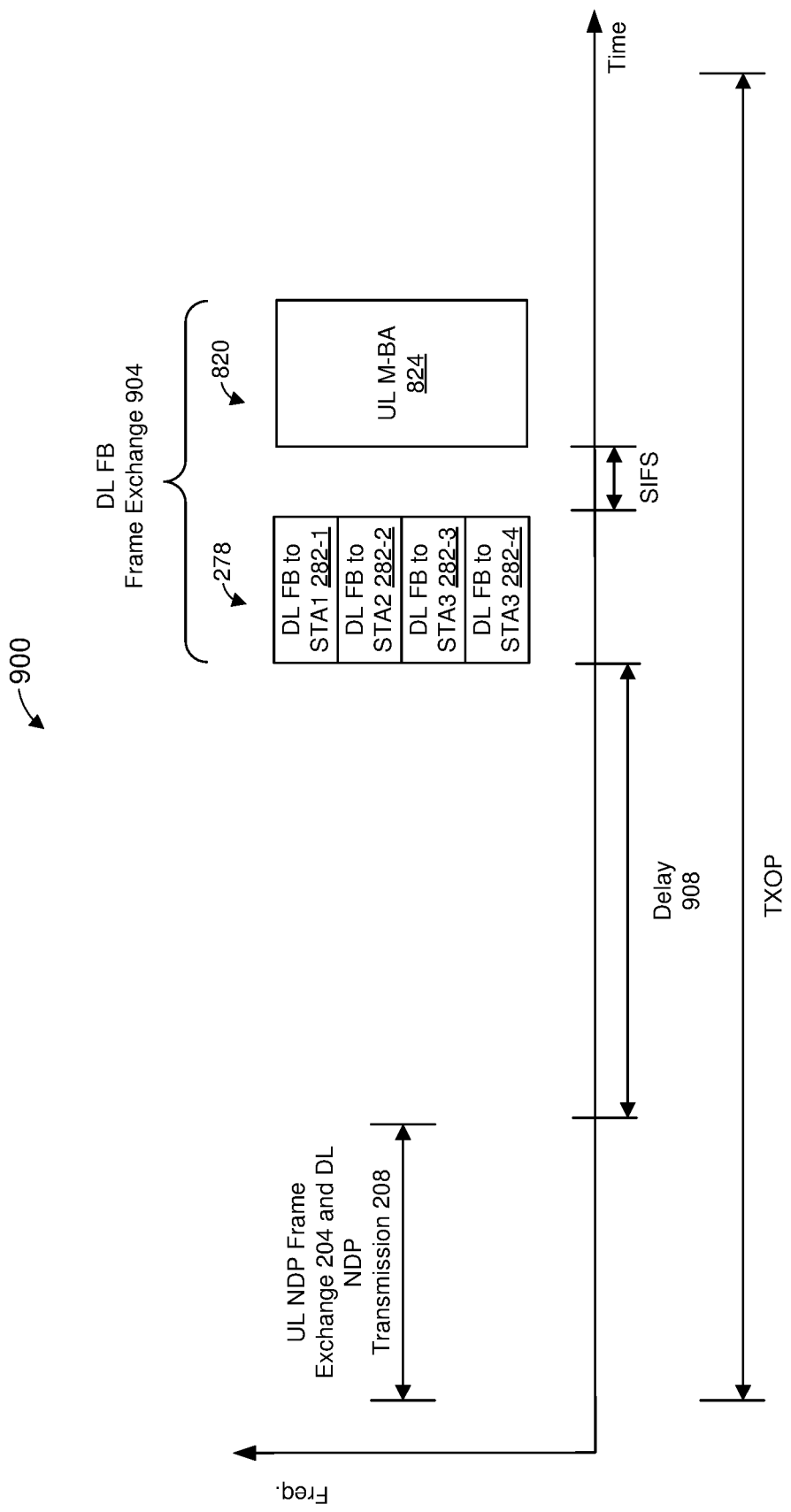
FIG. 9 is a diagram of another MU ranging measurement exchange in an MU ranging measurement procedure, according to another embodiment.

FIG. 9 is a diagram of another example MU ranging measurement exchange 900 in another MU ranging measurement procedure, according to an embodiment. The diagram 900 is described in the context of the example network 110 merely for explanatory purposes. In some embodiments, signals illustrated in FIG. 9 are generated by other suitable communication devices in other suitable types of wireless networks.

The MU ranging measurement exchange 900 corresponds to an AP-initiated MU ranging measurement exchange, according to an embodiment. The MU ranging measurement exchange 900 is similar to the MU ranging measurement exchange 270 of FIG. 2C, but a DL FB frame exchange 904 does not begin SIFS after the DL MU transmission 232 as in the MU ranging measurement exchange 270 of FIG. 2C. In an embodiment, the DL FB frame exchange 904 occurs after a delay period 908 after an end of the DL NDP transmission 208. In an embodiment, UL NDP exchange 204, the DL NDP transmission 208, and the DL FB frame exchange 904 occurs in one TXOP.

In an embodiment, the network interface device 122 determines (e.g., the MAC processor 126 determines) the delay period 908 such that the network interface device 122 will have sufficient time to prepare the feedback information to be included in the DL MU transmission 278.

In an embodiment, the network interface device 122 transmits a PPDU that is not related to the MU ranging measurement exchange 900 during the delay period 908 if the delay period 908 is sufficient to transmit the PPDU (and to receive an acknowledgment of the PPDU if the acknowledgment of the PPDU is required). For example, in an embodiment, the network interface device 122 transmits a PPDU that includes a MAC data frame, a MAC management frame, an MAC control frame, etc., to one of the client station 154 participating in the MU ranging measurement exchange 900. As another example, in an embodiment, the network interface device 122 transmits a PPDU that includes a MAC data frame, a MAC management frame, an MAC control frame, etc., to a client station 154 that is not participating in the MU ranging measurement exchange 900. As another example, in an embodiment, the network interface device 122 transmits a PPDU that is part of an MU ranging measurement exchange with another group of client stations that are not participating in the MU ranging measurement exchange 900.

In another embodiment, the MU ranging measurement exchange 900 further includes, after the delay period 908, the UL FB exchange 212 after the DL FB exchange 904.

Figure 10:
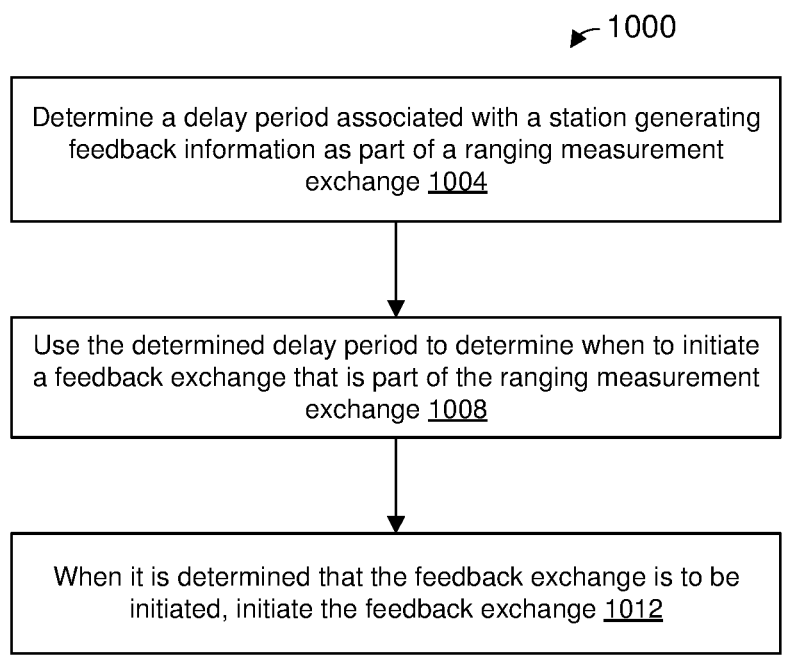
FIG. 10 is a flow diagram of an example method for initiating a transmission of feedback in an MU range measurement exchange, according to an embodiment.

FIG. 10 is a flow diagram of an example method 1000 for performing a ranging measurement exchange, according to an embodiment. In some embodiments, the network interface device 122 of FIG. 1 is configured to implement the method 1000. The method 1000 is described in the context of the network interface device 122 merely for explanatory purposes and, in other embodiments, the method 1000 is implemented by another suitable communication device. Additionally, the method 1000 is described in the context of the ranging exchange 600 of FIG. 6, the ranging exchange 700 of FIG. 7, the ranging exchange 800 of FIG. 8, and the ranging exchange 900 of FIG. 9, merely for explanatory purposes and, in other embodiments, the method 1000 is implemented in connection with other suitable ranging exchanges.

At block 1004, a first communication device determines (e.g., the network interface device 122 determines, e.g., the MAC processor 126 of the network interface device 122 determines; etc.) a delay period associated with a station generating feedback information as part of a ranging measurement exchange. For example, with regard to UL feedback, the client stations 154 report (e.g., transmit to the AP 114) respective times required by the client stations 154 to prepare feedback information to be included in the UL MU transmission 244 in a capabilities information element included in a MAC frame such as an association request frame, a reassociation request frame, an NDP measurement negotiation request frame, etc., according to an embodiment, and the MAC processor 126 of the network interface device 122 determines the delay period based on the reported times. As another example, with regard to DL feedback, the MAC processor 126 retrieves a predetermined delay period from a memory device, according to an embodiment.

At block 1008, the first communication device uses (e.g., the network interface device 122 uses, e.g., the MAC processor 126 of the network interface device 122 uses; etc.) the determined delay period to determine when to initiate a feedback exchange that is part of the ranging measurement exchange. For example, with respect to the example ranging measurement exchange 600 of FIG. 6, the first communication device determines (e.g., the network interface device 122 determines, e.g., the MAC processor 126 of the network interface device 122 determines; etc.) when to initiate the TXOP 612 and/or initiate transmission of the trigger frame 240, according to an embodiment. As another example, with respect to the example ranging measurement exchange 700 of FIG. 7, the first communication device determines (e.g., the network interface device 122 determines, e.g., the MAC processor 126 of the network interface device 122 determines; etc.) when to initiate transmission of the trigger frame 240, according to an embodiment. As another example, with respect to the example ranging measurement exchange 800 of FIG. 8, the first communication device determines (e.g., the network interface device 122 determines, e.g., the MAC processor 126 of the network interface device 122 determines; etc.) when to initiate the TXOP 812 and/or initiate transmission of the DL MU transmission 278, according to an embodiment. As another example, with respect to the example ranging measurement exchange 900 of FIG. 9, the first communication device determines (e.g., the network interface device 122 determines, e.g., the MAC processor 126 of the network interface device 122 determines; etc.) when to initiate transmission of the DL MU transmission 278, according to an embodiment.

At block 1012, when the first communication device determines that the feedback exchange is to be initiated, the first communication device initiates (e.g., the network interface device 122 initiates, e.g., the MAC processor 126 of the network interface device 122 initiates; etc.) the feedback exchange. For example, with respect to the example ranging measurement exchange 600 of FIG. 6, the first communication device initiates (e.g., the network interface device 122 initiates, e.g., the MAC processor 126 of the network interface device 122 initiates; etc.) transmission of the trigger frame 240 during the TXOP 612, according to an embodiment. As another example, with respect to the example ranging measurement exchange 700 of FIG. 7, the first communication device initiates (e.g., the network interface device 122 initiates, e.g., the MAC processor 126 of the network interface device 122 initiates; etc.) transmission of the trigger frame 240 after the delay period 708, according to an embodiment. As another example, with respect to the example ranging measurement exchange 800 of FIG. 8, the first communication device initiates (e.g., the network interface device 122 initiates, e.g., the MAC processor 126 of the network interface device 122 initiates; etc.) transmission of the DL MU transmission 278 during the TXOP 812, according to an embodiment. As another example, with respect to the example ranging measurement exchange 900 of FIG. 9, the first communication device initiates (e.g., the network interface device 122 initiates, e.g., the MAC processor 126 of the network interface device 122 initiates; etc.) transmission of the DL MU transmission 278 after the delay period 908, according to an embodiment.

Various techniques described in connection with FIGS. 2A-D, and 3-5 can be used in connection with various techniques described in connection with FIGS. 6-10.

Although techniques discussed above were described in the context of multi-user ranging measurement exchanges, the same or similar techniques can also be used in the context of single-user ranging measurement exchanges.

Figure 11A:
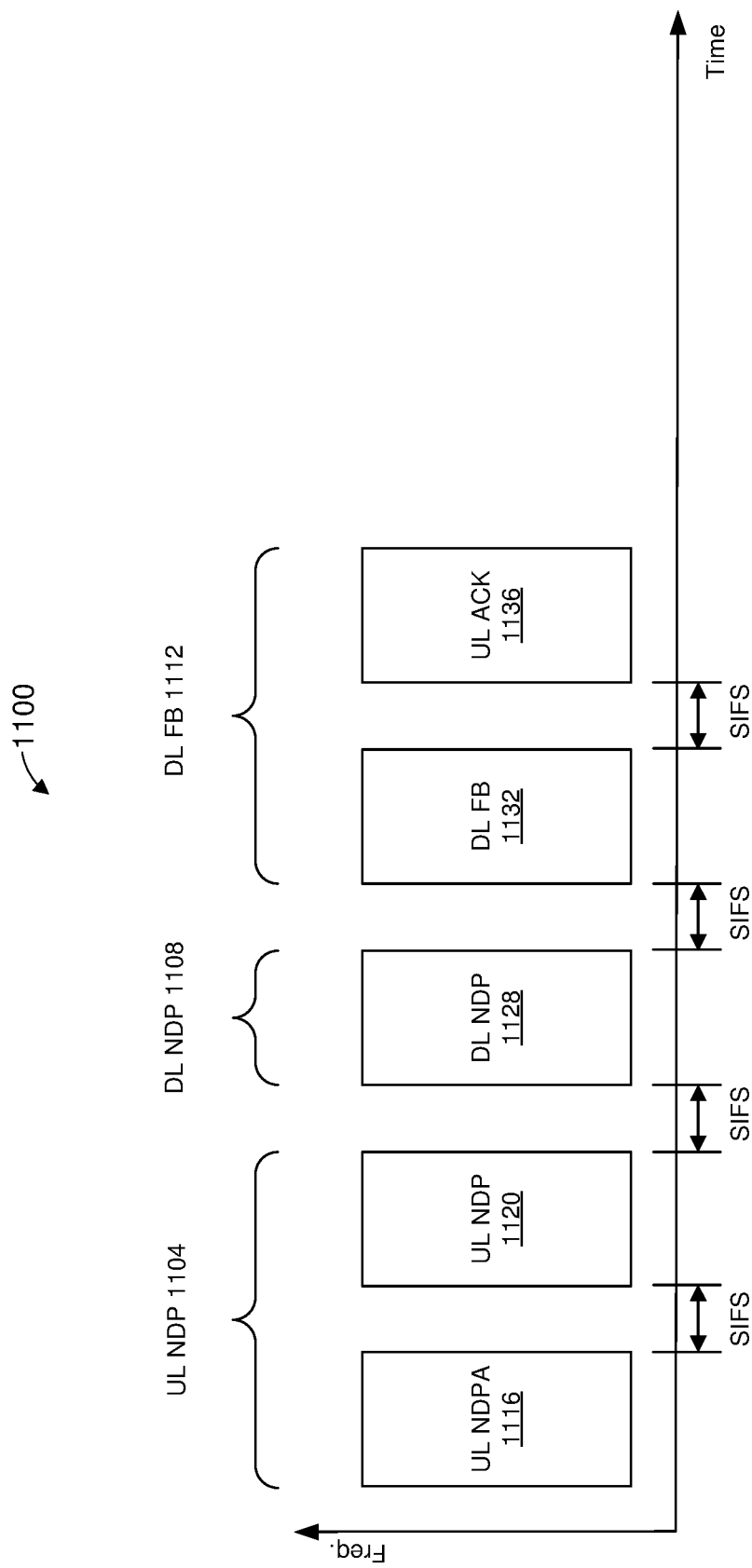
FIG. 11A is a diagram of an example single-user (SU) ranging measurement exchange in an SU ranging measurement procedure, according to an embodiment.

FIG. 11A is a diagram of an example single-user (SU) ranging measurement exchange 1100 in an SU ranging measurement procedure, according to an embodiment. The diagram 1100 is described in the context of the example network 110 merely for explanatory purposes. In some embodiments, signals illustrated in FIG. 11A are generated by other suitable communication devices in other suitable types of wireless networks.

The SU ranging measurement exchange 1100 corresponds to a client-initiated SU ranging measurement exchange, according to an embodiment. The SU ranging measurement exchange 100 includes an UL NDP transmission portion 1104, a DL NDP transmission portion 1108, and a DL feedback transmission portion 1112. In an embodiment, the uplink UL NDP transmission portion 1104, the DL NDP transmission portion 1108, and the DL feedback portion 1112 occur within a single TXOP. In another embodiment, the uplink UL NDP transmission portion 1104, the DL NDP transmission portion 1108, and the DL feedback transmission portion 1112 do not occur within a single TXOP.

In the UL NDP transmission portion 1104, a first communication device (e.g., the client station 154) transmits a PPDU 1116 that includes an SU UL NDPA 1116 having information indicating the initiation of an SU ranging measurement exchange. In an embodiment, the SU UL NDPA in the PPDU 1116 is a type of NDPA frame specifically for initiating an SU ranging measurement exchange such as the SU ranging measurement exchange 1100. The SU UL NDPA in the PPDU 1116 causes the AP 114 to be ready to receive an NDP as part of an SU ranging measurement exchange.

The client station 154 then begins transmitting an NDP 1120 a defined time period after an end of the PPDU 1116.

In an embodiment, the defined time period is SIFS. In other embodiments, another suitable time period is utilized.

The UL NDP 1120 includes PHY preambles having one or more STFs, one or more LTFs and one or more signal fields, in an embodiment. The UL NDP 1120 omits a data portion.

When transmitting the UL NDP 1116, the client station 154 records a time $t_1$ at which the client station 154 began transmitting the UL NDP 1116. Similarly, when the AP 114 receives the UL NDP 1116, the AP 114 records a time $t_2$ at which the AP 114 began receiving the UL NDP 1116.

In some embodiments, when transmitting the UL NDP 1116, the client station 154 (e.g., a client station 154 with multiple antennas 174) records an angle of departure, $AoD_1$, at which the UL NDP 1116 left the antennas 178 of the client station 154. Similarly, when the AP 114 receives the UL NDP 1116, the AP 114 records an angle of arrival, $AoA_1$, at which the UL NDP 1116 arrived at the antennas 138 of the AP 114.

Figure 11B:
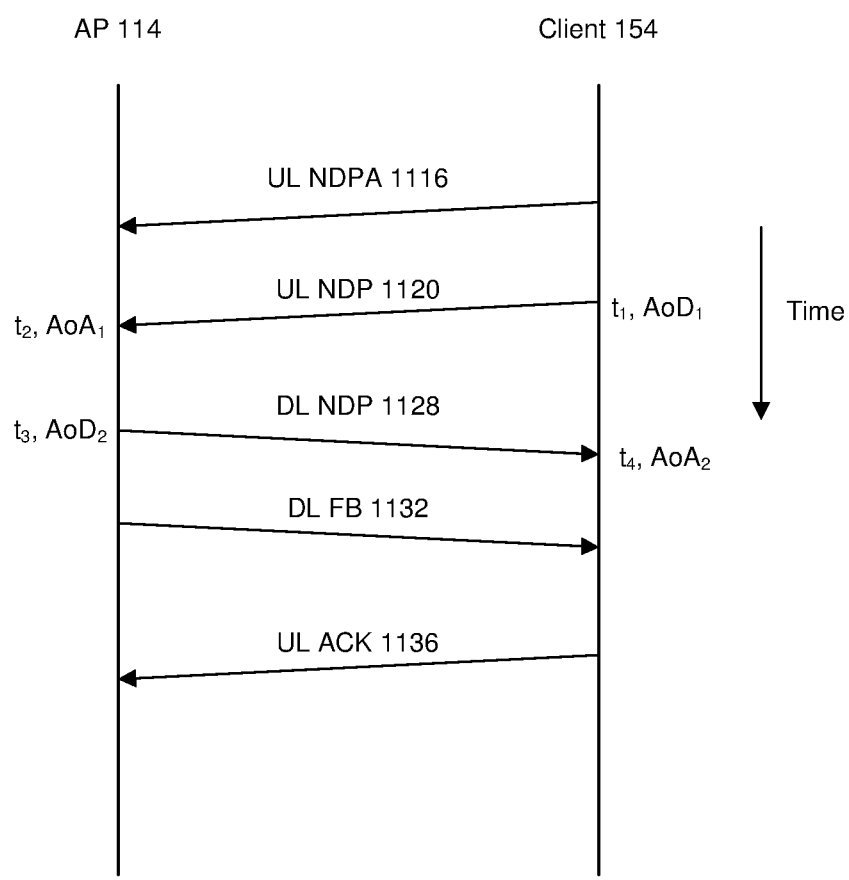
FIG. 11B is a timing diagram of the example SU ranging measurement exchange of FIG. 11A, according to an embodiment.

FIG. 11B is a timing diagram of the example MU ranging measurement exchange 1100 of FIG. 11A. As illustrated in FIG. 11B, the client station 154 records the time $t_1$ at which the client station 154 began transmitting the UL NDP 1120, and records the $AoD_1$ at which the UL NDP 1120 left the antennas 178 of the client station 154. Additionally, the AP 114 records the time $t_2$ at which the AP 114 began receiving the UL NDP 1120, and the $AoA_1$, at which each UL NDP 1120 arrived at the antennas 138 of the AP 114.

Referring now to FIGS. 11A and 11B, generates a DL NDP 1128 and, responsive to the UL NDP 1120, the AP 114 begins transmitting the DL NDP 1128 a defined time period after an end of the UL NDP 1120. In an embodiment, the defined time period is SIFS. In other embodiments, another suitable time period is utilized. The DL NDP 1128 includes a PHY preamble having one or more STFs, one or more LTFs and one or more signal fields, in an embodiment. The DL NDP 1128 omits a data portion.

When transmitting the DL NDP 1128, the AP 114 records a time $t_3$ at which the AP 114 began transmitting the DL NDP 1128. Similarly, when the client station 154 receives the DL NDP 1128, the client station 154 records a time $t_4$ at which the client station 154 began receiving the DL NDP 1128. As illustrated in FIG. 11B, the AP 114 records the time $t_3$ at which the AP 114 began transmitting the DL NDP 1128, and the client station 154 records the time $t_4$ at which the client station 154 began receiving the DL NDP 1128.

In some embodiments, when transmitting the DL NDP 1128, the AP 114 records an $AoD_2$ at which the DL NDP 1128 left the antennas 138 of the AP 114. Similarly, when the client station 154 receives the DL NDP 1128, the client station 154 records an $AoA_2$ at which the DL NDP 1128 arrived at the antennas 178 of the client station 154.

In another embodiment, responsive to the UL NDP 1120, the AP 114 begins transmitting a DL PPDU (not shown) that includes an NDPA frame a defined time period after an end of the UL NDP 1120. In an embodiment, the defined time period is SIFS. In other embodiments, another suitable time period is utilized. The NDPA frame is configured to cause the client stations 154 to be prepared to receive the DL NDP 1128 from the AP 114, according to an embodiment. The AP 114 then begins transmitting the DL NDP 1128 a defined time period after an end of the DL PPDU that includes the NDPA frame. In an embodiment, the defined time period is SIFS. In other embodiments, another suitable time period is utilized.

In an embodiment, the AP 114 transmits a DL PPDU 1132 a defined time period after an end of the DL NDP 1128. In an embodiment, the defined time period is SIFS. In other embodiments, another suitable time period is utilized. The PPDU 1132 corresponds to an uplink ranging measurement feedback packet. The PPDU 1132 includes the recorded times $t_2$ and $t_3$. In some embodiments, the PPDU 1132 respectively includes the recorded angles $AoA_1$ and $AoD_2$. In some embodiments, the PPDU 1132 optionally also includes respective channel estimate information determined by the AP 114 based on reception of the UL NDP 1120.

After receipt of the PPDU 1132, the client station 154 calculates a time-of-flight between the AP 114 and the client station 154 using the recorded times $t_1$, $t_2$, $t_3$, and $t_4$, according to an embodiment. Any suitable technique, including currently known techniques, may be utilized to calculate a time-of-flight using the recorded times $t_1$, $t_2$, $t_3$, and $t_4$. A distance between the AP 114 and the client station 154 may be calculated using the calculated times-of-flight, e.g., by respectively multiplying the times-of-flight by the speed of light, according to an embodiment.

In some embodiments, the client station 154 calculates an estimated position of the client station using the calculated time-of-flight. For example, the client station 154 uses triangulation techniques to calculate an estimated position of the client station 154 using the calculated time-of-flight. In some embodiments, the client station 154 calculates an estimated positions of the client station also using the recorded angles $AoD_1$, $AoA_1$, $AoD_2$, and $AoA_2$. For example, the recorded angles $AoD_1$, $AoA_1$, $AoD_2$, and $AoA_2$ are used as part of a triangulation algorithm for determining positions of communication devices.

Responsive to receipt of the PPDU 1132, the client station 154 generates an UL PPDU 1136 that includes an ACK frame, according to an embodiment. The client station 154 transmits the UL PPDU 1136 a defined time period after an end of the DL PPDU 1132. In an embodiment, the defined time period is SIFS. In other embodiments, another suitable time period is utilized.

In some embodiments, the DL feedback PPDU 1132 is in a single TXOP with the UL NDP transmission portion 1104 and the DL NDP transmission portion 1108, but includes feedback information for another SU ranging measurement exchange (not shown) that occurred prior to the UL NDP transmission portion 1104 and the DL NDP transmission portion 1108.

As will be described in more detail below, the client station 154 does not generate and transmit the UL PPDU 1136 even when the client station 154 successfully receives the DL PPDU 1132, according to an embodiment. Thus, in some embodiments, the UL PPDU 1136 is omitted from the procedure 1100. For example, if the network interface device 162 determines (e.g., the MAC processor 166 determines) that the network interface device 162 did not successfully receive the DL FB in the PPDU 1132, the network interface device 162 determines (e.g., the MAC processor 166 determines) that the SU ranging measurement exchange 1110 is to be repeated.

As discussed above, the DL FB in the PPDU 1132 may include, in addition to recorded times $t_2$ and $t_3$, one or more of i) the recorded angles $AoA_1$, ii) the recorded angles $AoD_2$, and iii) channel estimate information determined by the AP 114 based on reception of the UL NDP 1120.

In some embodiments, the AP 114 (e.g., the MAC processor 126) determines which feedback information is to be included in the PPDU 1132 (e.g., one or more of i) recorded angle $AoA_1$, ii) recorded angle $AoD_2$, and iii) channel estimate information determined by the AP 114 based on reception of the UL NDP 1120. In some embodiments, the AP 114 (e.g., the MAC processor 126) determines the granularity of channel estimate information to be included in the DL FB PPDU 1132.

In some embodiments, the client station 154 (e.g., the MAC processor 166) determines which information (e.g., the recorded angle $AoA_1$, the recorded angle $AoD_2$, channel estimate information, channel estimate information at a particular granularity, etc.) the AP 114 should include within the DL FB PPDU 1132. In some embodiments, the client station 154 includes an indication(s) of the requested information in the UL NDPA in the PPDU 1116. Upon receiving the UL NDPA in the PPDU 1116, the AP 114 determines which information to include in the DL FB PPDU 1132.

In some embodiments, the client station 154 (e.g., the MAC processor 166) generates one or more MAC frames that include information configured to cause the AP 114 to include, in the DL FB PPDU 1132, the requested information. The client station 154 then transmits the one or more MAC frames prior to the SU ranging measurement exchange 1100. Upon receiving the one or more MAC frames prior to the SU ranging measurement exchange 1100, the AP 114 determines which information to include in the DL FB PPDU 1132.

In an embodiment in which the client station 154 informs the AP 114 of which information to include in the DL FB 1132, the client station 154 estimates (e.g., the MAC processor 166 estimates) a time required for the AP 114 to transmit the DL FB PPDU 1132, and the client station 154 determines (e.g., the MAC processor 166 determines) a duration of a TXOP in which the SU ranging measurement exchange 1100 is to occur. In an embodiment, the UL NDPA in the PPDU 1116 includes an indication of the duration of the TXOP.

In some embodiments, the AP 114 and the client station 154 negotiate whether the AP 114 is to include, in the DL FB PPDU 1132, one or more of i) the recorded angle $AoA_1$, ii) the recorded angle $AoD_2$, iii) channel estimate information, and/or iv) the granularity of the channel estimate information prior to the SU ranging measurement exchange 1100. For example, in an embodiment, negotiating includes the client station 154 (e.g., the MAC processor 166) generating one or more MAC frames with information indicating requested types of information to be included and/or requested granularities, and the client station 154 transmits the one or more MAC frames to the AP 114 prior to the SU ranging measurement exchange 1100. Similarly, in an embodiment, negotiating includes the AP 114 (e.g., the MAC processor 126) generating one or more MAC frames with information indicating proposed types of information to be included and/or requested granularities, and the AP 114 transmits the one or more MAC frames to the client station 154 prior to the SU ranging measurement exchange 1100.

Figure 12:
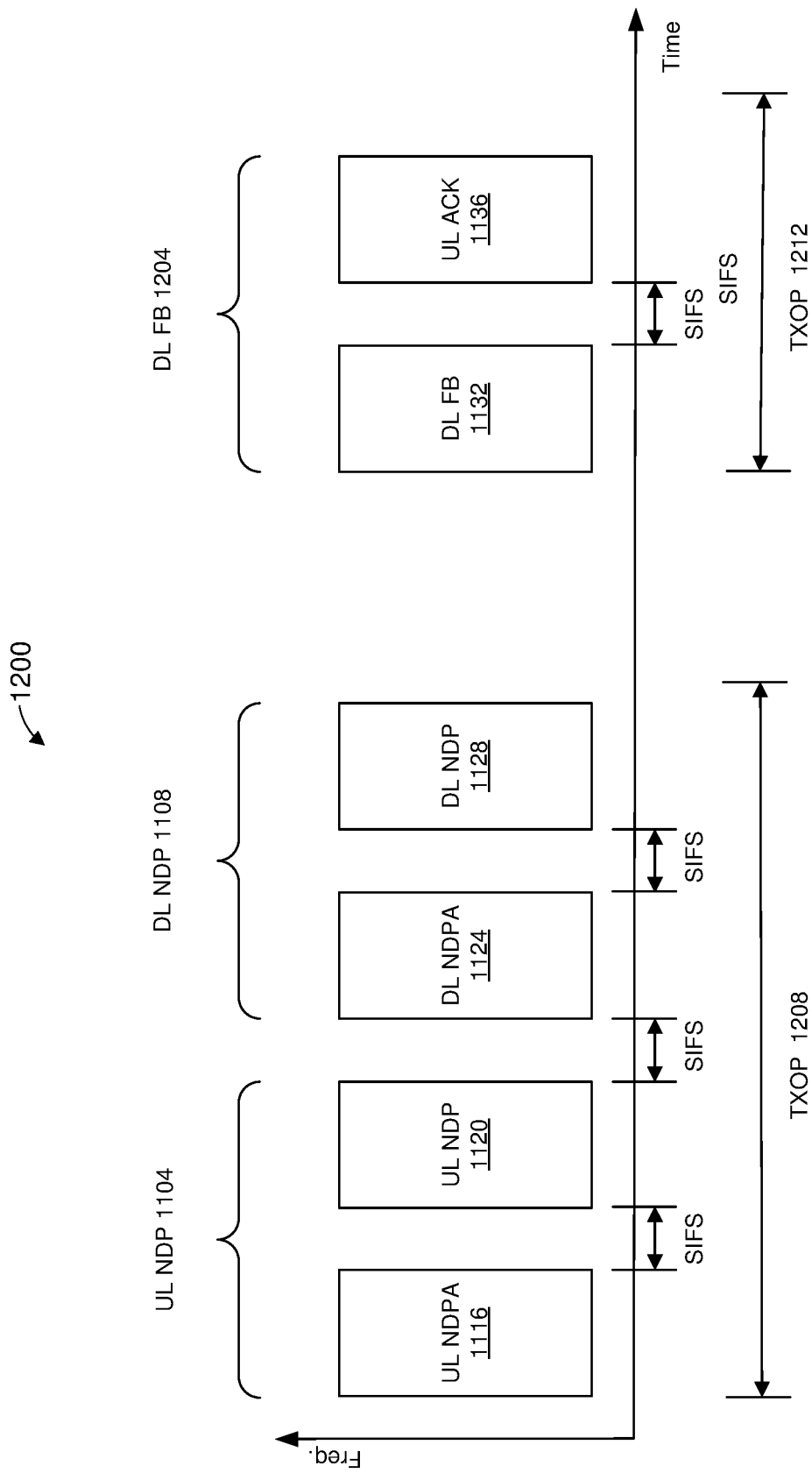
FIG. 12 is a diagram of another SU ranging measurement exchange in an SU ranging measurement procedure, according to another embodiment.

FIG. 12 is a diagram of another example SU ranging measurement exchange 1200 in another SU ranging measurement procedure, according to an embodiment. The diagram 1200 is described in the context of the example network 110 merely for explanatory purposes. In some embodiments, signals illustrated in FIG. 12 are generated by other suitable communication devices in other suitable types of wireless networks.

The SU ranging measurement exchange 1200 corresponds to a client station-initiated SU ranging measurement exchange, according to an embodiment. The SU ranging measurement exchange 1200 is similar to the SU ranging measurement exchange 1100 of FIG. 11A, but a DL FB portion 1204 does not begin SIFS after the DL NDP 1128 as in the SU ranging measurement exchange 1100 of FIG. 11A.

In an embodiment, the UL NDP portion 1104 and the DL NDP portion 1108 occur within a first TXOP 1208, whereas the DL FB portion 1204 occurs within a second TXOP 1212.

In some embodiments, the client station 154 does not transmit the UL ACK PPDU 1136 even when the client station 154 successfully receives the DL FB PPDU 1132, according to an embodiment. Thus, in some embodiments, the UL ACK PPDU 1136 is omitted from the procedure 1200.

In an embodiment, the network interface device 122 determines (e.g., the MAC processor 126 determines) a start time of the second TXOP 1212 such that the network interface device 122 will have sufficient time to prepare the feedback information to be included in the DL FB PPDU 1132. In an embodiment, the network interface device 122 determines (e.g., the MAC processor 126 determines) an earliest transmission time of the DL FB PPDU 1132 during the second TXOP 1212 such that the network interface device 122 will have sufficient time to prepare the feedback information to be included in the DL FB PPDU 1132.

In an embodiment, the network interface device 122 determines (e.g., the MAC processor 126 determines) a delay period after the DL NDP 1128 such that the AP 114 will have sufficient time to prepare the feedback information to be included in the DL FB PPDU 1132. The AP 114 then determines (e.g., the MAC processor 126 determines) when to initiate transmission of the DL FB PPDU 1132 based on the determined delay period.

Referring again to FIG. 11A, the UL NDP portion 1104, the DL NDP portion 1108, and the DL FB portion 1112 are performed during a single TXOP, but a delay between the DL NDP portion 1108 and the DL FB PPDU 1132 is provided so that the network interface device 122 has more time to prepare feedback information to be included in the DL FB PPDU 1132, according to an embodiment.

In an embodiment, the AP 114 reports (e.g., transmits to the client station 154) a time required by the AP 114 to prepare the feedback information to be included in the DL FB PPDU 1132, and the client station 154 (e.g., the MAC processor 166) uses the reported time to determine an earliest start time of the second TXOP 1212 such that client station 154 can i) go into a power save mode until the earliest start time of the second TXOP, ii) perform a frame exchange with another communication device prior to the second TXOP 1212, etc. In an embodiment, the network interface device 162 determines (e.g., the MAC processor 166 determines) an earliest transmission time of the DL FB PPDU 1132, and the client station 154 (e.g., the MAC processor 166) uses the reported time to determine an earliest start time of the transmission time of the DL FB PPDU 1132 such that client station 154 can i) go into a power save mode until the transmission time of the DL FB PPDU 1132, ii) perform a frame exchange with another communication device prior to transmission of the DL FB PPDU 1132, etc.

In an embodiment, the AP 114 reports (e.g., transmits to the client station 154) a time required by the AP 114 to prepare the feedback information to be included in the DL FB PPDU 1132 in a capabilities information element included in a MAC frame such as a beacon frame, an association response frame, a reassociation response frame, etc. In an embodiment, the capabilities information element includes a field for reporting a time required by a station to prepare the feedback information to be included in a PPDU related to DL ranging measurement feedback.

In an embodiment, if the client station 154 does not successfully receive the DL NDP 1128, the network interface device 162 determines (e.g., the MAC processor 166 determines) that the SU ranging measurement exchange 1200 is to be restarted. Thus, in an embodiment, after the client station 154 receives the DL FB PPDU 1132, the client station transmits a new PPDU with a new UL NDPA similar to the UL NDPA 1116 and a new UL NDP similar to the UL NDP 1120 to restart the SU ranging measurement exchange 1200. In an embodiment, the network interface 162 (e.g., the MAC processor 166) generates the new UL NDPA with a sequence number that is the same as a sequence number included in the original UL NDPA of the PPDU 1116. When the AP 114 receives the new PPDU that includes the new UL NDPA with the same sequence number as in the original UL NDPA of the PPDU 1116, the AP 114 determines (e.g., the MAC processor 126 determines) that i) any measurements taken with regard to the original UL NDP 1120 should be discarded, and ii) the measurements should be retaken in connection with the new UL NDP, according to an embodiment.

In some embodiments in which the client station 154 does not transmit UL ACK PPDUs 1136, if the client station 154 does not successfully receive the DL FB PPDU 1132, the network interface device 162 determines (e.g., the MAC processor 166 determines) that the SU ranging measurement exchange 1200 is to be restarted. Thus, in an embodiment, in response to determining that the DL FB PPDU 1132 was not successfully received, the client station transmits a new PPDU with a new UL NDPA similar to the UL NDPA 1116 and a new UL NDP similar to the UL NDP 1120 to restart the SU ranging measurement exchange 1200. In an embodiment, the network interface 162 (e.g., the MAC processor 166) generates the new UL NDPA with a sequence number that is the same as a sequence number included in the original UL NDPA of the PPDU 1116. When the AP 114 receives the new PPDU that includes the new UL NDPA with the same sequence number as in the original UL NDPA of the PPDU 1116, the AP 114 determines (e.g., the MAC processor 126 determines) that i) any measurements taken with regard to the original UL NDP 1120 should be discarded, and ii) the measurements should be retaken in connection with the new UL NDP, according to an embodiment.

Figure 13:
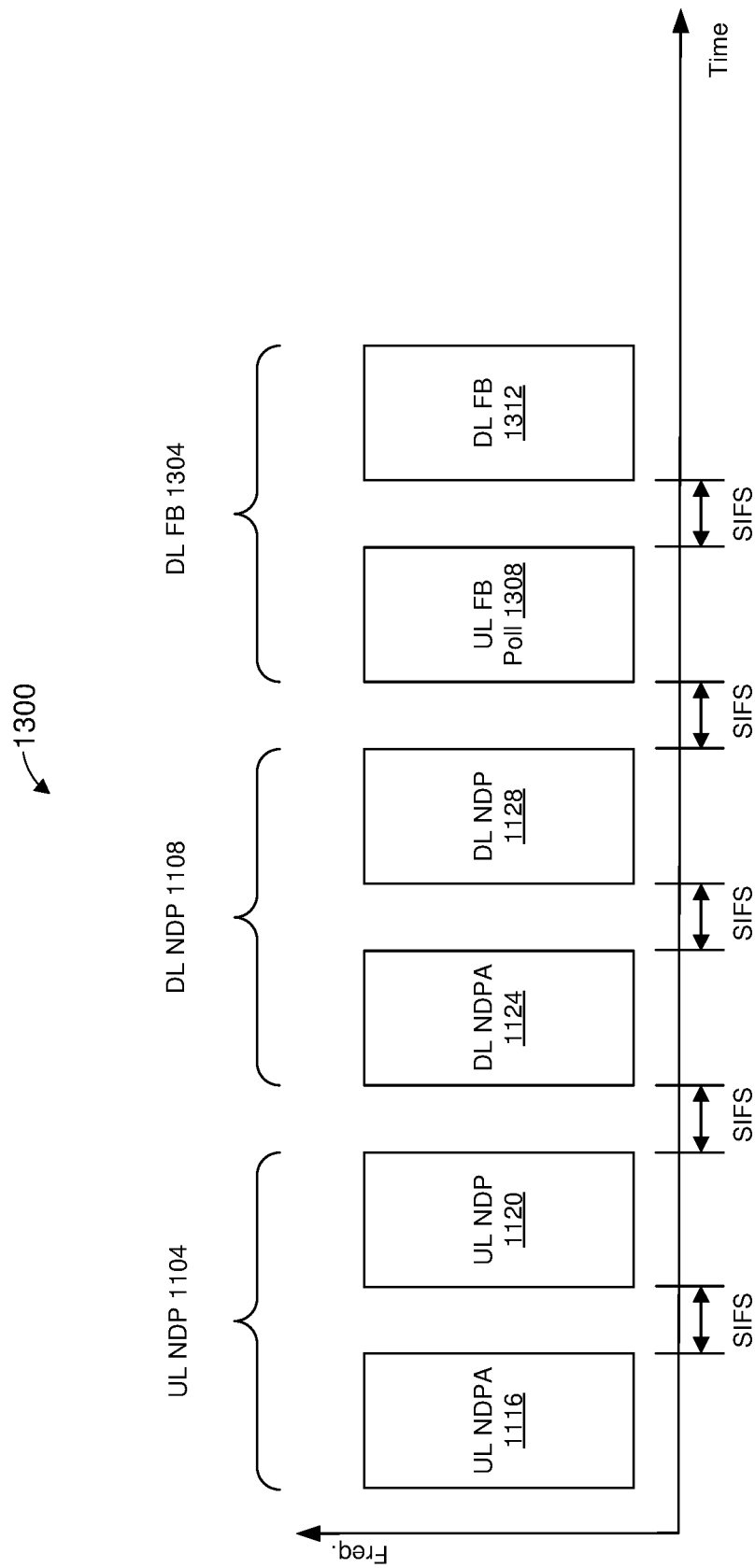
FIG. 13 is a diagram of another SU ranging measurement exchange in an SU ranging measurement procedure, according to another embodiment.

FIG. 13 is a diagram of another example SU ranging measurement exchange 1300 in another SU ranging measurement procedure, according to an embodiment. The diagram 1300 is described in the context of the example network 110 merely for explanatory purposes. In some embodiments, signals illustrated in FIG. 13 are generated by other suitable communication devices in other suitable types of wireless networks.

The SU ranging measurement exchange 1300 corresponds to a client station-initiated SU ranging measurement exchange, according to an embodiment. The SU ranging measurement exchange 1300 is similar to the SU ranging measurement exchange 1100 of FIG. 11A, but a DL FB portion 1304 is different than the DL FB portion 1112 of FIG. 11A. In an embodiment, the UL NDP portion 1104, the DL NDP portion 1108, and the DL FB portion 1304 occur within a single TXOP.

In an embodiment, the network device 162 generates (e.g., the MAC processor 166 generates) an UL FB poll frame, and the network device 162 transmits (e.g., the PHY processor 170 transmits) the UL FB poll frame in a PPDU 1308. The UL FB poll frame is configured to cause the AP 114 to transmit DL FB that includes the recorded times $t_2$ and $t_3$. In some embodiments, the DL FB includes the recorded angles $AoA_1$ and $AoD_2$. In some embodiments, the DL FB optionally also includes channel estimate information determined by the AP 114 based on reception of the UL NDP 1120.

In an embodiment, the UL FB poll frame is a MAC frame configured to cause the AP 114 to transmit the DL FB. In an embodiment, each of the UL NDPA frame in the PPDU 1116 and the UL FB poll frame in the PPDU 1308 is an NDPA frame that includes a field that indicates whether the NDPA frame is i) initiating a SU NDP ranging measurement exchange, or ii) is soliciting feedback in connection with the SU NDP ranging measurement exchange.

In an embodiment, the client station 154 conditionally transmits the UL FB poll frame in a PPDU 1308 based on whether the client station 154 successfully received the DL NDP 1128. For example, the network interface device 162 determines (e.g., the MAC processor 166 determines) whether the network interface device 162 successfully received the DL NDP 1128. In response to determining that the network interface device 162 successfully received the DL NDP 1128, the network interface device 162 transmits the UL FB poll frame in a PPDU 1308. On the other hand, in response to determining that the network interface device 162 did not successfully receive the DL NDP 1128, the network interface device 162 does not transmit the UL FB poll frame in a PPDU 1308; rather, the network interface device 162 restarts the SU ranging measurement exchange 1300 by transmitting an UL NDPA in a PPDU 1116.

In an embodiment, the AP 114 transmits a DL PPDU 1312 a defined time period after an end of the UL PPDU 1308. In an embodiment, the defined time period is SIFS. In other embodiments, another suitable time period is utilized. In some embodiments, the client station 154 transmits an ACK frame (not shown) in response to successfully receiving the DL FB in the DL PPDU 1312. In other embodiments, the client station 154 does not transmits an ACK frame even when the client station 154 successfully receives the DL FB in the DL PPDU 1312.

Figure 14:
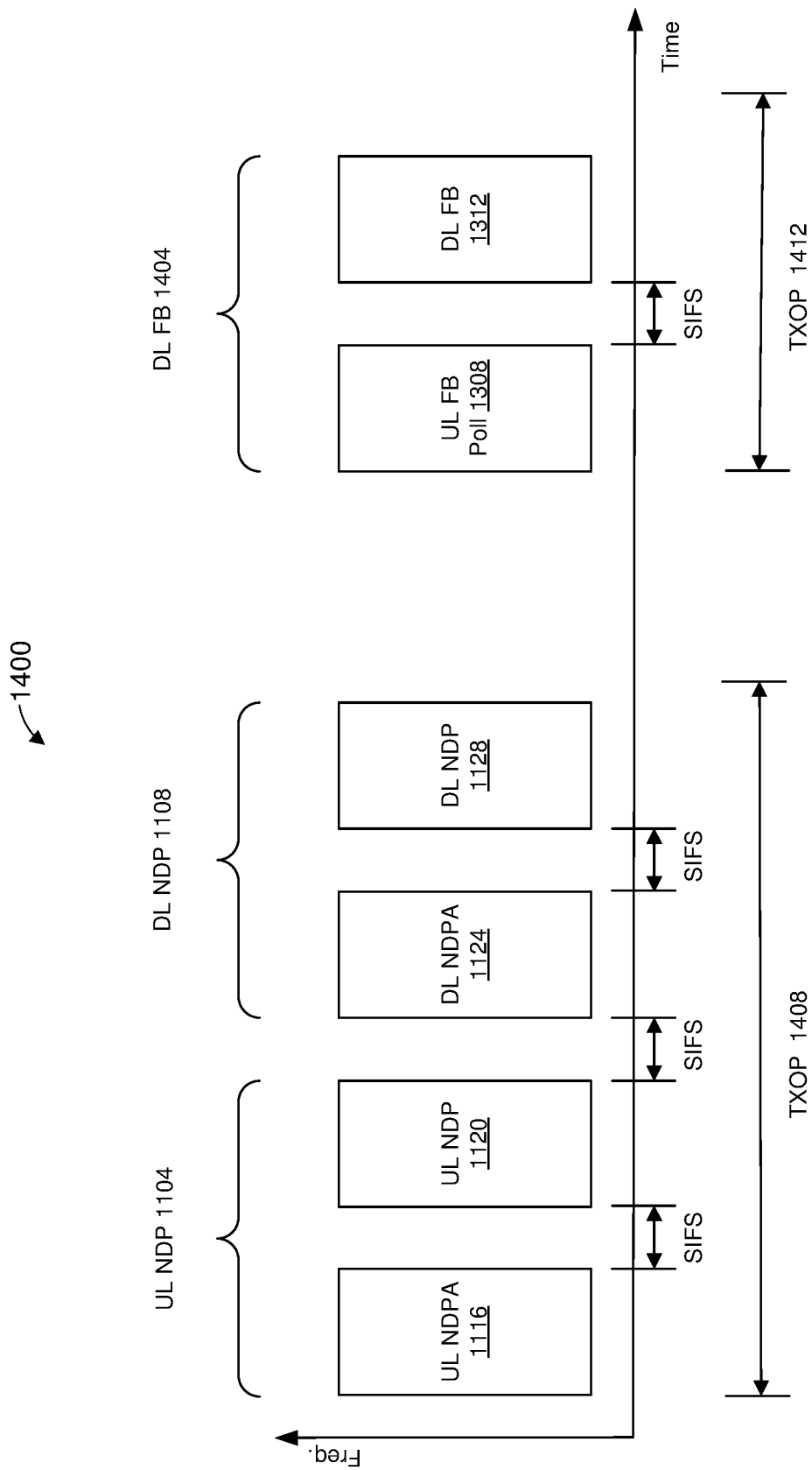
FIG. 14 is a diagram of another SU ranging measurement exchange in an SU ranging measurement procedure, according to another embodiment.

FIG. 14 is a diagram of another example SU ranging measurement exchange 1400 in another SU ranging measurement procedure, according to an embodiment. The diagram 1400 is described in the context of the example network 110 merely for explanatory purposes. In some embodiments, signals illustrated in FIG. 14 are generated by other suitable communication devices in other suitable types of wireless networks.

The SU ranging measurement exchange 1400 corresponds to a client station-initiated SU ranging measurement exchange, according to an embodiment. The SU ranging measurement exchange 1400 is similar to the SU ranging measurement exchange 1300 of FIG. 13, but a DL FB portion 1404 does not begin SIFS after the DL NDP 1128 as in the SU ranging measurement exchange 1300 of FIG. 13. In an embodiment, the UL NDP portion 1104 and the DL NDP portion 1108 occur within a first TXOP 1408, whereas the DL FB portion 1404 occurs within a second TXOP 1412.

In an embodiment, the network interface device 162 determines (e.g., the MAC processor 166 determines) a start time of the second TXOP 1412 such that the AP 114 will have sufficient time to prepare the feedback information to be included in the DL FB PPDU 1312. In an embodiment, the network interface device 162 determines (e.g., the MAC processor 126 determines) an earliest transmission time of the UL FB Poll PPDU 1308 during the second TXOP 1412 such that the AP 114 will have sufficient time to prepare the feedback information to be included in the DL FB PPDU 1312.

In an embodiment, the network interface device 162 determines (e.g., the MAC processor 166 determines) a delay period after the DL NDP 1128 such that the AP 114 will have sufficient time to prepare the feedback information to be included in the DL FB PPDU 1312. The client station then determines (e.g., the MAC processor 166 determines) when to initiate transmission of the UL FB Poll PPDU 1308 based on the determined delay period.

Referring again to FIG. 13, the UL NDP portion 1104, the DL NDP portion 1108, and the DL FB portion 1304 are performed during a single TXOP, but a delay between the DL NDP portion 1108 and the UL FB poll PPDU 1308 is provided so that the AP 114 has more time to prepare feedback information to be included in the DL FB PPDU 1312, according to an embodiment.

In an embodiment, the AP 114 reports (e.g., transmits to the client station 154) a time required by the AP 114 to prepare the feedback information to be included in the DL FB PPDU 1312, and the client station 154 (e.g., the MAC processor 166) uses the reported time to determine an earliest start time of the second TXOP 1412 such that client station 154 can i) go into a power save mode until the earliest start time of the second TXOP 1412, ii) perform a frame exchange with another communication device prior to the second TXOP 1412, etc. In an embodiment, the network interface device 162 determines (e.g., the MAC processor 166 determines) an earliest transmission time of the UL FB Poll PPDU 1308 such that client station 154 can i) go into a power save mode until the transmission time of the UL FB Poll PPDU 1308, ii) perform a frame exchange with another communication device prior to transmission of the UL FB Poll PPDU 1308, etc.

In an embodiment, the AP 114 reports (e.g., transmits to the client station 154) a time required by the AP 114 to prepare the feedback information to be included in the DL FB PPDU 1312 in a capabilities information element included in a MAC frame such as a beacon frame, an association response frame, a reassociation response frame, etc. In an embodiment, the capabilities information element includes a field for reporting a time required by a station to prepare the feedback information to be included in a PPDU related to DL ranging measurement feedback.

In an embodiment, if the client station 154 does not successfully receive the DL NDP 1128, the network interface device 162 determines (e.g., the MAC processor 166 determines) that the SU ranging measurement exchange 1200 is to be restarted. Thus, in an embodiment, in response to the network interface device 162 determining (e.g., the MAC processor 166 determining), that the network interface device 162 did not successfully receive the DL NDP 1128, the client station transmits a new PPDU with a new UL NDPA similar to the UL NDPA 1116 and a new UL NDP similar to the UL NDP 1120 to restart the SU ranging measurement exchange 1400. In an embodiment, the network interface 162 (e.g., the MAC processor 166) generates the new UL NDPA with a sequence number that is the same as a sequence number included in the original UL NDPA of the PPDU 1116. When the AP 114 receives the new PPDU that includes the new UL NDPA with the same sequence number as in the original UL NDPA of the PPDU 1116, the AP 114 determines (e.g., the MAC processor 126 determines) that i) any measurements taken with regard to the original UL NDP 1120 should be discarded, and ii) the measurements should be retaken in connection with the new UL NDP, according to an embodiment.

In some embodiments in which the client station 154 does not transmit UL ACK PPDUs in response to successfully receiving the DL FB PPDU 1312, if the client station 154 does not successfully receive the DL FB PPDU 1312, the network interface device 162 determines (e.g., the MAC processor 166 determines) that another UL FB poll PPDU similar to the UL FB poll PPDU 1308 is to be transmitted. Thus, in an embodiment, in response to determining that the DL FB PPDU 1312 was not successfully received, the client station transmits a new UL FB poll PPDU similar to the UL FB poll PPDU 1308.

Although FIGS. 11A, 11B, and 12-14 were described in the context of a ranging measurement exchange between a client station and an AP, in other embodiments, the same or similar ranging measurement exchanges are performed between two client stations.

Figure 15:
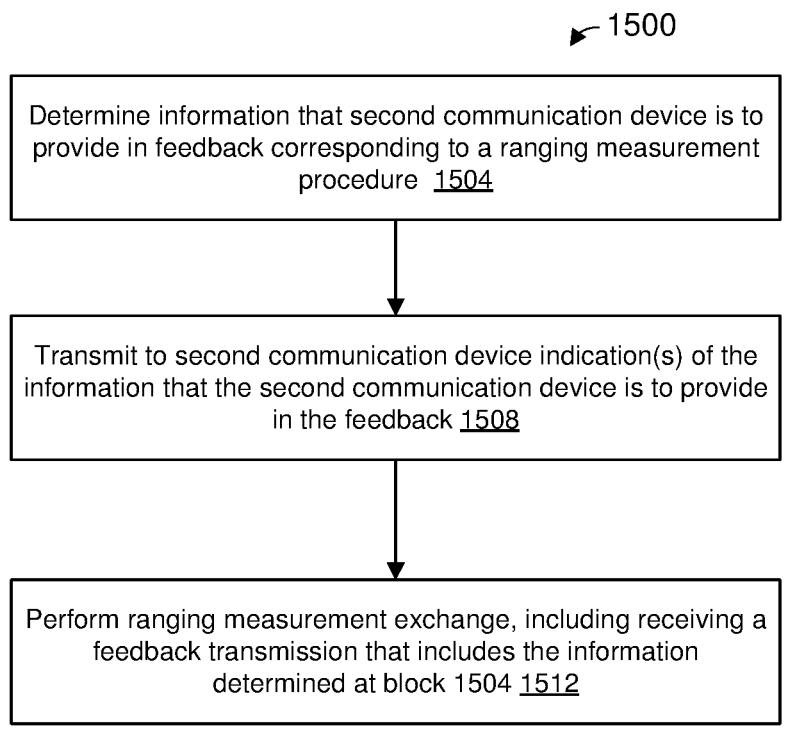
FIG. 15 is a flow diagram of an example method for performing an SU range measurement exchange, according to an embodiment.

FIG. 15 is a flow diagram of an example method 1500 for performing a ranging measurement exchange, according to an embodiment. In some embodiments, the network interface device 162 of FIG. 1 is configured to implement the method 1500. The method 1500 is described in the context of the network interface device 162 merely for explanatory purposes and, in other embodiments, the method 1500 is implemented by another suitable communication device. The method 1500 can be implemented in the context of ranging measurement exchanges such as those described with reference to FIGS. 11A and 12-14, according to some embodiments. The method 1500, however, is implemented in connection with other suitable ranging exchanges, in other embodiments.

At block 1504, a first communication device determines (e.g., the network interface device 162 determines, e.g., the MAC processor 126 of the network interface device 122 determines; etc.) information that a second communication device (e.g., the AP 114, another client station, etc.) is to provide in a feedback transmission (e.g., the DL FB PPDU 1132, the DL FB PPDU 1312, etc.) to the first communication device, wherein the feedback transmission is a part of the ranging measurement exchange. In an embodiment, the MAC processor 166 determines whether the second communication device is to include, in the feedback transmission, one or more of i) the recorded angle $AoA_1$, ii) the recorded angle $AoD_2$, iii) channel estimate information, and/or iv) the granularity of the channel estimate information.

In some embodiments, block 1504 comprises the first communication device determining the information that the second communication device is to provide in the feedback transmission without negotiating with the second communication device regarding which information (and/or, if the information includes channel estimate information, a granularity of the channel estimate information) the second communication device is to provide in the feedback transmission. In other embodiments, block 1504 comprises the first communication device negotiating with the second communication device regarding which information (and/or, if the information includes channel estimate information, a granularity of the channel estimate information) the second communication device is to provide in the uplink feedback transmission.

At block 1508, the first communication device transmits (e.g., the network interface device 162 transmits, etc.) to the second communication device an indication or indications of the information determined at block 1504. In an embodiment, the network interface device 162 includes an indication or indications of the information determined at block 1504 in the UL NDPA PPDU 1116 216 (FIGS. 11A, 12-14). In an embodiment, the network interface device 162 includes an indication or indications of the information determined at block 1504 in the UL FP poll PPDU 1308 (FIGS. 13, 14). In an embodiment, the network interface device 162 includes an indication or indications of the information determined at block 1504 in a PPDU transmitted prior to the ranging measurement exchange 1100/1200/1300/1400.

At block 1512, the first communication device performs the ranging measurement exchange with the second communication device. Block 1512 includes the first communication device receiving, in a feedback transmission from the second communication device, wherein the feedback transmission includes the information determined at block 404. In an embodiment, block 1512 includes performing the uplink transmissions discussed with respect to any of FIGS. 11A and 12-14, and receiving the downlink transmissions discussed with respect to any of FIGS. 11A and 12-14. In an embodiment, block 1512 includes receiving the information determined at block 1504 in DL FB PPDU 1132 or DL FB PPDU 1312.

Figure 16:
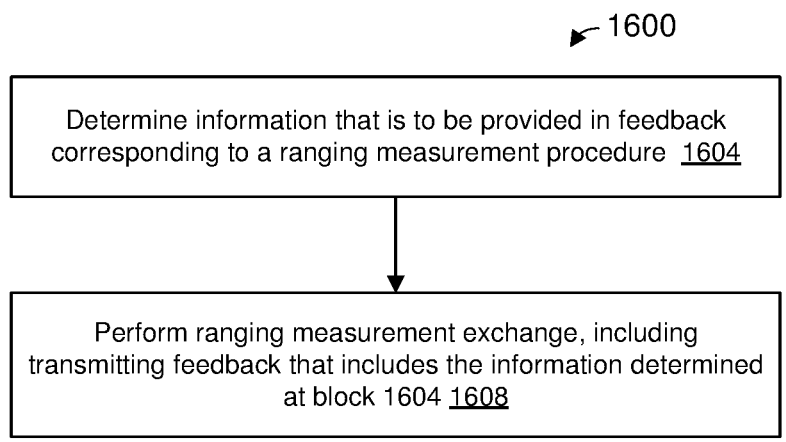
FIG. 16 is a flow diagram of another example method for performing an SU range measurement exchange, according to another embodiment.

FIG. 16 is a flow diagram of another example method 1600 for performing a ranging measurement exchange, according to an embodiment. In some embodiments, the network interface device 122 of FIG. 1 is configured to implement the method 1600. The method 1600 is described in the context of the network interface device 122 merely for explanatory purposes and, in other embodiments, the method 1600 is implemented by another suitable communication device, such as the network interface device 162. The method 1600 can be implemented in the context of ranging measurement exchanges such as those described with reference to FIGS. 11A and 12-14, according to some embodiments. The method 1600, however, is implemented in connection with other suitable ranging exchanges, in other embodiments.

At block 1604, a first communication device determines (e.g., the network interface device 122 determines, e.g., the MAC processor 126 of the network interface device 122 determines; etc.) information that the first communication device is to provide in a feedback transmission (e.g., the DL FB PPDU 1132/1312) to a second communication device (e.g., the client station 154), wherein the feedback transmission is a part of the ranging measurement exchange. In an embodiment, the MAC processor 126 determines whether the DL FB PPDU 1132/1312 is to include one or more of i) the recorded angle $AoA_1$, ii) the recorded angle $AoD_2$, iii) channel estimate information, and/or iv) the granularity of the channel estimate information.

In some embodiments, block 1604 comprises the first communication device determining the information that is to be provided in the feedback transmission without being instructed by, and without negotiating with, the second communication device regarding which information (and/or, if the information includes channel estimate information, a granularity of the channel estimate information) is to be provided in the feedback transmission.

In another embodiment, the method 1600 is performed in conjunction with the method 1500, and block 1604 comprises receiving a transmission from the second communication device (e.g., corresponding to the transmission of block 1508 of FIG. 15), where the transmission includes an indication(s) of which information (and/or, if the information includes channel estimate information, a granularity of the channel estimate information) is to be provided in the feedback transmission. In various embodiments, the received transmission is the NDPA PPDU 116, the UL FB poll PPDU 1308, or a transmission prior to the ranging measurement exchange. In another embodiment, the method 1600 is performed in conjunction with the method 1500, and block 1604 comprises negotiating with the second communication device regarding which information (and/or, if the information includes channel estimate information, a granularity of the channel estimate information) is to be provided in the feedback transmission.

At block 1608, the first communication device performs the ranging measurement exchange with the second communication device. Block 1608 includes the first communication device transmitting, in a feedback transmission, the information determined at block 1604. In an embodiment, block 1608 includes performing the downlink transmissions discussed with respect to any of FIGS. 11A and 12-14, and receiving the uplink transmissions discussed with respect to any of FIGS. 11A and 12-14. In an embodiment, block 1608 includes transmitting the information determined at block 1604 in DL FB PPDU 1132 or DL FB PPDU 1312.

Figure 17:
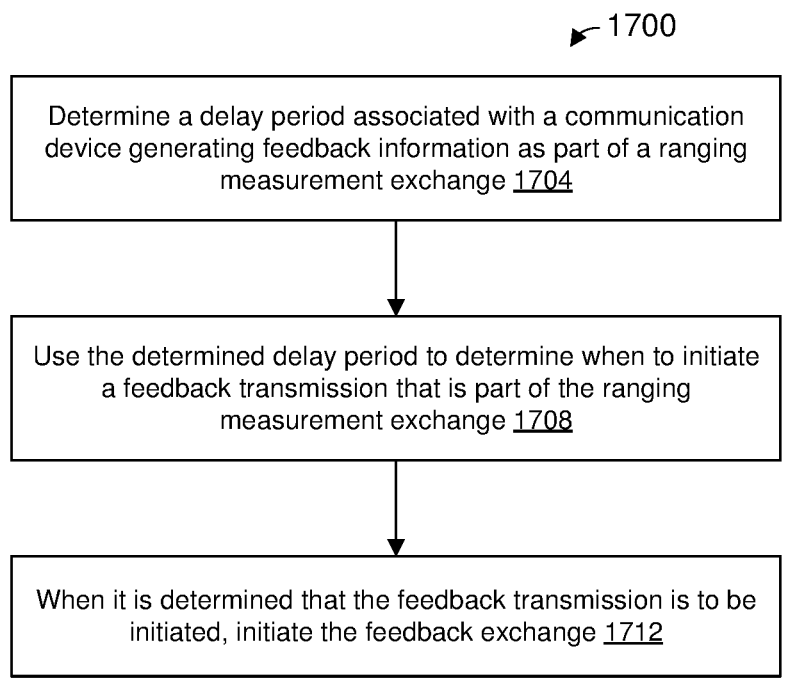
FIG. 17 is a flow diagram of an example method for initiating a transmission of feedback in an SU range measurement exchange, according to an embodiment.

FIG. 17 is a flow diagram of an example method 1700 for performing a ranging measurement exchange, according to an embodiment. In some embodiments, the network interface device 122 of FIG. 1 is configured to implement the method 1700. In other embodiments, the network interface device 162 of FIG. 1 is configured to implement the method 1700. The method 1700 is described in the context of the network interface device 122/162 merely for explanatory purposes and, in other embodiments, the method 1700 is implemented by another suitable communication device. The method 1700 can be implemented in the context of ranging measurement exchanges such as those described with reference to FIGS. 11A and 12-14, according to some embodiments. The method 1700, however, is implemented in connection with other suitable ranging exchanges, in other embodiments.

At block 1704, a first communication device determines (e.g., the network interface device 122 determines, e.g., the MAC processor 126 of the network interface device 122 determines; the network interface device 162 determines, e.g., the MAC processor 166 of the network interface device 162 determines; etc.) a delay period associated with a communication device (e.g., the first communication device or a second communication device) generating feedback information as part of a ranging measurement exchange. For example, with regard to DL feedback, the AP 114 reports a time required by the AP 114 to prepare feedback information to be included in the DL FB PPDU 1132/1312 in a capabilities information element included in a MAC frame such as a beacon frame, an association response frame, a reassociation response frame, etc., according to an embodiment, and the MAC processor 166 of the network interface device 162 determines the delay period based on the reported time. As another example, with regard to DL feedback, the MAC processor 126 retrieves a predetermined delay period from a memory device, according to an embodiment. As another example, with regard to feedback from another client station, the other client station reports a time required by the other client station to prepare feedback information to be included in a FB PPDU like the PPDU 1132/1312 in a capabilities information element included in a MAC frame such as an association request frame, a reassociation request frame, etc., according to an embodiment, and the MAC processor 166 of the network interface device 162 determines the delay period based on the reported time.

At block 1708, the first communication device uses (e.g., the network interface device 122 uses, e.g., the MAC processor 126 of the network interface device 122 uses; the network interface device 162 uses, e.g., the MAC processor 166 of the network interface device 122 uses; etc.) the determined delay period to determine when to initiate a feedback transmission that is part of the ranging measurement exchange.

For example, with respect to the example ranging measurement exchange 1100 of FIG. 11A, the first communication device determines (e.g., the network interface device 122 determines, e.g., the MAC processor 126 of the network interface device 122 determines; etc.) when to initiate transmission of the DL FB PPDU 1132, according to an embodiment. As another example, with respect to the example ranging measurement exchange 1200 of FIG. 12, the first communication device determines (e.g., the network interface device 122 determines, e.g., the MAC processor 126 of the network interface device 122 determines; etc.) when to initiate the TXOP 1212 and/or initiate transmission of the DL FB PPDU 1132, according to an embodiment.

As another example, with respect to the example ranging measurement exchange 1300 of FIG. 13, the first communication device determines (e.g., the network interface device 162 determines, e.g., the MAC processor 166 of the network interface device 162 determines; etc.) when to initiate transmission of the UL FB poll PPDU 1308, according to an embodiment. As another example, with respect to the example ranging measurement exchange 1400 of FIG. 14, the first communication device determines (e.g., the network interface device 162 determines, e.g., the MAC processor 166 of the network interface device 162 determines; etc.) when to initiate the TXOP 1212 and/or transmission of the UL FB poll PPDU 1308, according to an embodiment.

At block 1712, when the first communication device determines that the feedback transmission is to be initiated, the first communication device initiates (e.g., the network interface device 122 initiates, e.g., the MAC processor 126 of the network interface device 122 initiates; the network interface device 162 initiates, e.g., the MAC processor 166 of the network interface device 162 initiates; etc.) the feedback transmission.

For example, with respect to the example ranging measurement exchange 1100 of FIG. 11A and the example ranging measurement exchange 1200 of FIG. 12, the first communication device initiates (e.g., the network interface device 122 initiates, e.g., the MAC processor 126 of the network interface device 122 initiates; etc.) transmission of the DL FB PPDU 1132, according to an embodiment.

As another example, with respect to the example ranging measurement exchange 1300 of FIG. 13 and the example ranging measurement exchange 1400 of FIG. 14, the first communication device initiates (e.g., the network interface device 162 initiates, e.g., the MAC processor 166 of the network interface device 162 initiates; etc.) e transmission of the UL FB poll PPDU 1308, according to an embodiment.

Various techniques described in connection with FIGS. 11A and 12-17 can be used in combination. For example, various techniques described in connection with FIGS. 15 and 16 can be used in combination with various techniques described in connection with FIG. 17.

Embodiment 1: A method, including: determining, at a first communication device, which one or more types of feedback information, from among a plurality of types of feedback information associated with a range measurement exchange session, a second communication device is to provide to the first communication device in a feedback packet transmitted as part of the range measurement exchange session; transmitting, by the first communication device and to the second communication device, one or more indications of the determined one or more types of feedback information that the second communication device is to provide to the first communication device in the feedback packet; and performing, at the first communication device, the range measurement exchange, including receiving the feedback packet from the second communication device, wherein the feedback packet includes the determined one or more types of feedback information.

Embodiment 2: The method of embodiment 1, wherein the plurality of types of information includes: an angle of arrival of a first null data packet, an angle of departure of a second null data packet, and channel estimate information determined based on reception of the first null data packet.

Embodiment 3: The method of embodiment 2, wherein the plurality of types of information further includes: a first granularity of the channel estimate information, and a second granularity of the channel estimate information.

Embodiment 4: The method of any of embodiments 1-3, wherein determining which one or more types of feedback information the second communication device is to provide in the feedback packet comprises: exchanging packets between the first communication device and the second communication device as part of a negotiation regarding which one or more types of feedback information the second communication device is to provide in the feedback packet.

Embodiment 5: The method of any of embodiments 1-3, wherein: performing the range measurement exchange comprises transmitting i) a null data packet announcement (NDPA) frame, and ii) transmitting a null data packet (NDP); and transmitting the one or more indications of the determined one or more types of feedback information includes transmitting the one or more indications of the determined one or more types of feedback information in the NDPA.

Embodiment 6: The method of any of embodiments 1-3, wherein: the range measurement exchange is a multi-user range measurement exchange; the second communication device is a client station among a plurality of client stations participating in the multi-user range measurement exchange; performing the range measurement exchange comprises transmitting a trigger frame to cause the plurality of client stations to transmit range measurement feedback information as part of an uplink multi-user transmission; the feedback packet is included in the multi-user transmission; and transmitting the one or more indications of the determined one or more types of feedback information includes transmitting the one or more indications of the determined one or more types of feedback information in the trigger frame.

Embodiment 7: The method of embodiment 6, further comprising: determining, at the first communication device, a delay time to permit the plurality of client stations to prepare the range measurement feedback information; and determining, at the first communication device, when to transmit the trigger frame based on the delay time.

Embodiment 8: The method of any of embodiments 1-3, wherein: performing the range measurement exchange comprises transmitting a poll frame to cause the second communication device to transmit the feedback packet; and transmitting the one or more indications of the determined one or more types of feedback information includes transmitting the one or more indications of the determined one or more types of feedback information in the poll frame.

Embodiment 9: The method of embodiment 8, further comprising: determining, at the first communication device, a delay time to permit the second communication device to prepare the feedback information; and determining, at the first communication device, when to transmit the poll frame based on the delay time.

Embodiment 10: The method of any of embodiments 1-9, further comprising: determining, at the first communication device, that the feedback packet was successfully received; and not transmitting, by the first communication device, an acknowledgment packet to acknowledge successfully receiving the feedback packet.

Embodiment 11: An apparatus, comprising: a network interface device associated with a first communication device. The network interface device is configured to: determine which one or more types of feedback information, from among a plurality of types of feedback information associated with a range measurement exchange session, a second communication device is to provide to the first communication device in a feedback packet transmitted as part of the range measurement exchange session; and transmit, to the second communication device, one or more indications of the determined one or more types of feedback information that the second communication device is to provide to the first communication device in the feedback packet, and perform the range measurement exchange, including receiving the feedback packet from the second communication device, wherein the feedback packet includes the determined one or more types of feedback information.

Embodiment 12: The apparatus of embodiment 11, wherein the plurality of types of information includes: an angle of arrival of a first null data packet, an angle of departure of a second null data packet, and channel estimate information determined based on reception of the first null data packet.

Embodiment 13: The apparatus of embodiment 12, wherein the plurality of types of information further includes: a first granularity of the channel estimate information, and a second granularity of the channel estimate information.

Embodiment 14: The apparatus of any of embodiments 11-13, wherein the network interface device is configured to: exchange packets between the first communication device and the second communication device as part of a negotiation regarding which one or more types of feedback information the second communication device is to provide in the feedback packet.

Embodiment 15: The apparatus of any of embodiments 11-13, wherein the network interface device is configured to: transmit i) a null data packet announcement (NDPA) frame, and ii) transmitting a null data packet (NDP) as part of performing the range measurement exchange; and transmit the one or more indications of the determined one or more types of feedback information in the NDPA.

Embodiment 16: The apparatus of any of embodiments 11-13, wherein: the range measurement exchange is a multi-user range measurement exchange; the second communication device is a client station among a plurality of client stations participating in the multi-user range measurement exchange; the network interface device is configured to transmit a trigger frame, as part of performing the range measurement exchange, to cause the plurality of client stations to transmit range measurement feedback information as part of an uplink multi-user transmission; the feedback packet is included in the multi-user transmission; and the network interface device is configured to transmit the one or more indications of the determined one or more types of feedback information in the trigger frame.

Embodiment 17: The apparatus of embodiments 16, wherein the network interface device is configured to: determine a delay time to permit the plurality of client stations to prepare the range measurement feedback information; and determine when to transmit the trigger frame based on the delay time.

Embodiment 18: The apparatus of any of embodiments 11-13, wherein the network interface device is configured to: transmit a poll frame, as part of performing the range measurement exchange, to cause the second communication device to transmit the feedback packet; and transmit the one or more indications of the determined one or more types of feedback information in the poll frame.

Embodiment 19: The apparatus of embodiments 18, wherein the network interface device is configured to: determine a delay time to permit the second communication device to prepare the feedback information; and determine when to transmit the poll frame based on the delay time.

Embodiment 20: The apparatus of any of embodiments 11-13, wherein the network interface device is configured to: determine that the feedback packet was successfully received; and not transmit an acknowledgment packet to acknowledge successfully receiving the feedback packet.

Embodiment 21: A method, including: determining, at a first communication device, which one or more types of feedback information, from among a plurality of types of feedback information associated with a range measurement exchange session, the first communication device is to provide to a second communication device in a feedback packet transmitted as part of the range measurement exchange session; and performing, at the first communication device, the range measurement exchange with the second communication device, including transmitting the feedback packet to the second communication device, wherein the feedback packet includes the determined one or more types of feedback information.

Embodiment 22: The method of embodiment 21, wherein the plurality of types of information includes: an angle of arrival of a first null data packet, an angle of departure of a second null data packet, and channel estimate information determined based on reception of the first null data packet.

Embodiment 23: The method of embodiment 22, wherein the plurality of types of information further includes: a first granularity of the channel estimate information, and a second granularity of the channel estimate information.

Embodiment 24: The method of any of embodiments 21-23, wherein determining which one or more types of feedback information the first communication device is to provide in the feedback packet comprises: exchanging packets between the first communication device and the second communication device as part of a negotiation regarding which one or more types of feedback information the first communication device is to provide in the feedback packet.

Embodiment 25: The method of any of embodiments 21-23, wherein: performing the range measurement exchange comprises receiving, at the first communication device, i) a null data packet announcement (NDPA) frame from the second communication device, and ii) a null data packet (NDP) from the second communication device; and determining which one or more types of feedback information the first communication device is to provide to the second communication device includes analyzing, in the NDPA, one or more indications of which one or more types of feedback information the first communication device is to provide to the second communication device.

Embodiment 26: The method of any of embodiments 21-23, wherein: the range measurement exchange is a multi-user range measurement exchange; the first communication device is a client station among a plurality of client stations participating in the multi-user range measurement exchange; the second communication device is an access point (AP); performing the range measurement exchange comprises receiving a trigger frame from the AP, the trigger frame configured to cause the plurality of client stations to transmit range measurement feedback information as part of an uplink multi-user transmission; the feedback packet is transmitted in response to the trigger frame; and determining which one or more types of feedback information the first communication device is to provide to the second communication device includes analyzing, in the trigger frame, one or more indications of which one or more types of feedback information the first communication device is to provide to the second communication device.

Embodiment 27: The method of any of embodiments 21-23, wherein: performing the range measurement exchange comprises receiving a poll frame to configured to cause the first communication device to transmit the feedback packet; and determining which one or more types of feedback information the first communication device is to provide to the second communication device includes analyzing, in the poll frame, one or more indications of which one or more types of feedback information the first communication device is to provide to the second communication device.

Embodiment 28: An apparatus, comprising: a network interface device. The network interface device is configured to: determine which one or more types of feedback information, from among a plurality of types of feedback information associated with a range measurement exchange session, is to be provided to a second communication device in a feedback packet transmitted as part of the range measurement exchange session; and perform the range measurement exchange, including transmitting the feedback packet to the second communication device, wherein the feedback packet includes the determined one or more types of feedback information.

Embodiment 29: The apparatus of embodiment 28, wherein the plurality of types of information includes: an angle of arrival of a first null data packet, an angle of departure of a second null data packet, and channel estimate information determined based on reception of the first null data packet.

Embodiment 30: The apparatus of embodiment 29, wherein the plurality of types of information further includes: a first granularity of the channel estimate information, and a second granularity of the channel estimate information.

Embodiment 31: The apparatus of any of embodiments 28-30, wherein the network interface device is configured to: exchange packets between the first communication device and the second communication device as part of a negotiation regarding which one or more types of feedback information the first communication device is to provide in the feedback packet.

Embodiment 32: The apparatus of any of embodiments 28-30, wherein the network interface device is configured to: receive, as part of the range measurement exchange, i) a null data packet announcement (NDPA) frame from the second communication device, and ii) a null data packet (NDP) from the second communication device; and analyze, in the NDPA, one or more indications of which one or more types of feedback information the first communication device is to provide to the second communication device.

Embodiment 33: The apparatus of any of embodiments 28-30, wherein: the range measurement exchange is a multi-user range measurement exchange; the first communication device is a client station among a plurality of client stations participating in the multi-user range measurement exchange; the second communication device is an access point (AP); the network interface device is configured to receive, as part of the range measurement exchange, a trigger frame from the AP, the trigger frame configured to cause the plurality of client stations to transmit range measurement feedback information as part of an uplink multi-user transmission; the feedback packet is transmitted in response to the trigger frame; and the network interface device is configured to analyze, in the trigger frame, one or more indications of which one or more types of feedback information the first communication device is to provide to the second communication device.

Embodiment 34: The apparatus of any of embodiments 28-30, wherein the network interface device is configured to: receive, as part of the range measurement exchange, a poll frame to configured to cause the first communication device to transmit the feedback packet; and analyze one or more indications, in the poll frame, of which one or more types of feedback information the first communication device is to provide to the second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for range measurement in a wireless communication network, comprising:
at a first client station, exchanging packets between the first client station and an access point as part of a negotiation for a range measurement session, including receiving from the access point one or more indications of one or more types of feedback information, from among a plurality of types of feedback information associated with range measurements, that are to be communicated between the first client station and the access point in the range measurement session, the one or more indications including a first indication of whether angular information associated with range measurements are to be communicated between the first client station and the access point in the range measurement session;
using, at the first client station, the one or more indications of the one or more types of feedback information received from the access point to determine the one or more types of feedback information that are to be communicated between the first client station and the access point in the range measurement session, including determining whether angular information associated with range measurements are to be communicated between the first client station and the access point in the range measurement session;
after exchanging the packets as part of the negotiation, receiving, at the first client station, a first downlink physical layer (PHY) data unit with one or more first trigger frames that are configured to prompt the first client station and one or more second client stations to transmit respective first null data packets (NDPs) a short interface space (SIFS) after an end of reception of the first downlink PHY data unit as part of the range measurement session;
in response to receiving the first downlink PHY data unit having the one or more first trigger frames, transmitting, by the first client station, the respective first NDP to the access point as part of a first uplink multi-user (MU) PHY transmission that also includes simultaneous transmissions by the one or more second client stations of one or more other respective first NDPs to the access point as part of the range measurement session;
receiving, at the first client station, a second downlink PHY data unit SIFS after an end of transmission of the first NDP by the first client station, wherein the second downlink PHY data unit includes one or more null data packet announcement (NDPA) frames that indicate that the access point will transmit a third downlink PHY data unit SIFS after an end of transmission of the second downlink PHY data unit, the third downlink PHY data unit having one or more second NDPs;
receiving, by the first client station, the third downlink PHY data unit SIFS after the end of reception of the second downlink PHY data unit, the third downlink PHY data unit having the one or more second NDPs; and
receiving, by the first client station, a fourth downlink PHY data unit from the access point SIFS after an end of reception of the third downlink PHY data unit, the fourth downlink PHY data unit including respective downlink feedback frames for the first client station and the one or more second client stations, wherein a first downlink feedback frame, among the respective downlink feedback frames, for the first client station includes, when angular information associated with range measurements are to be communicated between the first client station and the access point, first angular information corresponding to reception by the access point of a) the respective first NDP transmitted by the first client station or b) a third NDP previously transmitted by the first client station.

2. The method of claim 1, wherein the first angular information comprises one of i) angle of arrival information corresponding to the respective first NDP transmitted by the first client station and ii) angle of arrival information corresponding to the third NDP previously transmitted by the first client station.

3. The method of claim 1, wherein the first downlink feedback frame for the first client station further includes, when angular information associated with range measurements are to be communicated between the first client station and the access point, second angular information corresponding to transmission by the access point of a) the one or more second NDPs or b) a fourth NDP previously transmitted by the access point.

4. The method of claim 3, wherein the second angular information comprises one of i) angle of departure information corresponding to the one or more second NDPs transmitted by the access point and ii) angle of departure information corresponding to the fourth NDP previously transmitted by the access point.

5. The method of claim 1, further comprising:
determining, at the first client station, second angular information corresponding to reception, by the first client station, of one of the one or more second NDPs in the third downlink PHY data unit;
determining, at the first client station, third angular information corresponding to reception, by the first client station, of a fourth NDP previously transmitted by the access point;
generating, at the first client station, an uplink feedback frame that includes, when the first client station determines that angular information associated with range measurements are to be communicated between the first client station and the access point, one of i) the second angular information and ii) the third angular information; and
transmitting, by the first client station, the uplink feedback frame to the access point.

6. The method of claim 5, wherein:
the second angular information comprises angle of arrival information corresponding to reception, by the first client station, of the one second NDP in the third downlink PHY data unit; and
the third angular information comprises angle of arrival information corresponding to reception, by the first client station, of the fourth NDP previously transmitted by the access point.

7. The method of claim 5, wherein:
the one or more indications of one or more types of feedback information that are to be communicated between the first client station and the access point in the range measurement session further include a second indication of whether channel estimate information associated with range measurements are to be communicated between the first client station and the access point in the range measurement session;
using the one or more indications of the one or more types of feedback information received from the access point to determine the one or more types of feedback information that are to be communicated between the first client station and the access point in the range measurement session further comprises determining whether channel estimate information associated with range measurements are to be communicated between the first client station and the access point in the range measurement session;
the method further comprises:
determining, at the first client station, first channel estimate information corresponding to reception, by the first client station, of one of the one or more second NDPs in the third downlink PHY data unit, and
determining, at the first client station, second channel estimate information corresponding to reception, by the first client station, of a fourth NDP previously transmitted by the access point;
generating the uplink feedback frame comprises generating the uplink feedback frame to further include, when the first client station determines that channel estimate information associated with range measurements are to be communicated between the first client station and the access point, one of i) the first channel estimate information and ii) the second channel estimate information.

8. The method of claim 5, further comprising:
receiving, by the first client station, a fifth downlink PHY data unit from the access point, the fifth downlink PHY data unit having one or more second trigger frames that are configured to prompt the first client station and the one or more second client stations to transmit respective uplink feedback frames SIFS after an end of reception of the fifth downlink PHY data unit;
wherein transmitting the uplink feedback frame to the access point is in response to the first client station receiving the fifth downlink PHY data unit having the one or more second trigger frames, transmission of the uplink feedback frame being part of a second uplink MU PHY transmission that also includes simultaneous transmissions by the one or more second client stations of one or more other uplink feedback frames to the access point.

9. The method of claim 1, wherein:
the one or more indications of one or more types of feedback information that are to be communicated between the first client station and the access point in the range measurement session further include a second indication of whether channel estimate information associated with range measurements are to be communicated between the first client station and the access point in the range measurement session;
using the one or more indications of the one or more types of feedback information received from the access point to determine the one or more types of feedback information that are to be communicated between the first client station and the access point in the range measurement session further comprises determining whether channel estimate information associated with range measurements are to be communicated between the first client station and the access point in the range measurement session; and
the first downlink feedback frame for the first client station, when channel estimate information associated with range measurements are to be communicated between the first client station and the access point, further includes first channel estimate information corresponding to reception by the access point of a) the respective first NDP transmitted by the first client station or b) the third NDP previously transmitted by the first client station.

10. A first client station configured for use in a wireless local area network (WLAN), the first client station comprising:
a wireless network interface, the wireless network interface comprising one or more integrated circuit (IC) devices configured to:
control the wireless network interface to exchange packets between the first client station and an access point as part of a negotiation for a range measurement session, including receiving, from the access point one or more indications of one or more types of feedback information, from among a plurality of types of feedback information associated with range measurements, that are to be communicated between the first client station and the access point in the range measurement session, the one or more indications including a first indication of whether angular information associated with range measurements are to be communicated between the first client station and the access point in the range measurement session,
use the one or more indications of the one or more types of feedback information received from the access point to determine the one or more types of feedback information that are to be communicated between the first client station and the access point in the range measurement session, including determining whether angular information associated with range measurements are to be communicated between the first client station and the access point in the range measurement session,
after exchanging the packets as part of the negotiation, receive a first downlink physical layer (PHY) data unit with one or more first trigger frames that are configured to prompt the first client station and one or more second client stations to transmit respective first null data packets (NDPs) a short interface space (SIFS) after an end of reception of the first downlink PHY data unit as part of the range measurement session,
control the wireless network interface to transmit, in response to receiving the first downlink PHY data unit having the one or more first trigger frames, the respective first NDP to the access point as part of a first uplink multi-user (MU) PHY transmission that also includes simultaneous transmissions by the one or more second client stations of one or more other respective first NDPs to the access point as part of the range measurement session,
receive a second downlink PHY data unit SIFS after an end of transmission of the first NDP by the first client station, wherein the second downlink PHY data unit includes one or more null data packet announcement (NDPA) frames that indicate that the access point will transmit a third downlink PHY data unit SIFS after an end of transmission of the second downlink PHY data unit, the third downlink PHY data unit having one or more second NDPs,
receive the third downlink PHY data unit SIFS after the end of reception of the second downlink PHY data unit, the third downlink PHY data unit having the one or more second NDPs, and
receive a fourth downlink PHY data unit from the access point SIFS after an end of reception of the third downlink PHY data unit, the fourth downlink PHY data unit including respective downlink feedback frames for the first client station and the one or more second client stations, wherein a first downlink feedback frame, among the respective downlink feedback frames, for the first client station includes, when angular information associated with range measurements are to be communicated between the first client station and the access point, first angular information corresponding to reception by the access point of a) the respective first NDP transmitted by the first client station or b) a third NDP previously transmitted by the first client station.

11. The first client station of claim 10, wherein the first angular information comprises one of i) angle of arrival information corresponding to the respective first NDP transmitted by the first client station and ii) angle of arrival information corresponding to the third NDP previously transmitted by the first client station.

12. The first client station of claim 10, wherein the first downlink feedback frame for the first client station further includes, when angular information associated with range measurements are to be communicated between the first client station and the access point, second angular information corresponding to transmission by the access point of a) the one or more second NDPs or b) a fourth NDP previously transmitted by the access point.

13. The first client station of claim 12, wherein the second angular information comprises one of i) angle of departure information corresponding to the one or more second NDPs transmitted by the access point and ii) angle of departure information corresponding to the fourth NDP previously transmitted by the access point.

14. The first client station of claim 10, wherein the one or more IC devices are further configured to:
determine second angular information corresponding to reception, by the first client station, of one of the one or more second NDPs in the third downlink PHY data unit;
determine third angular information corresponding to reception, by the first client station, of a fourth NDP previously transmitted by the access point;
generate an uplink feedback frame that includes, when the one or more IC devices determine that angular information associated with range measurements are to be communicated between the first client station and the access point, one of i) the second angular information and ii) the third angular information; and
control the wireless network interface to transmit the uplink feedback frame to the access point.

15. The first client station of claim 14, wherein:
the second angular information comprises angle of arrival information corresponding to reception, by the first client station, of the one second NDP in the third downlink PHY data unit; and
the third angular information comprises angle of arrival information corresponding to reception, by the first client station, of the fourth NDP previously transmitted by the access point.

16. The first client station of claim 14, wherein:
the one or more indications of one or more types of feedback information that are to be communicated between the first client station and the access point in the range measurement session further include a second indication of whether channel estimate information associated with range measurements are to be communicated between the first client station and the access point in the range measurement session;
the one or more IC devices are further configured to:
use the one or more indications of the one or more types of feedback information received from the access point to determine whether channel estimate information associated with range measurements are to be communicated between the first client station and the access point in the range measurement session, and
determine first channel estimate information corresponding to reception, by the first client station, of one of the one or more second NDPs in the third downlink PHY data unit,
determine second channel estimate information corresponding to reception, by the first client station, of a fourth NDP previously transmitted by the access point, and
generate the uplink feedback frame to further include, when the one or more IC devices determine that channel estimate information associated with range measurements are to be communicated between the first client station and the access point, one of i) the first channel estimate information and ii) the second channel estimate information.

17. The first client station of claim 14, wherein the one or more IC devices are further configured to:
receive a fifth downlink PHY data unit from the access point, the fifth downlink PHY data unit having one or more second trigger frames that are configured to prompt the first client station and the one or more second client stations to transmit respective uplink feedback frames SIFS after an end of reception of the fifth downlink PHY data unit; and
control the wireless network interface to transmit the uplink feedback frame in response to the first client station receiving the fifth downlink PHY data unit having the one or more second trigger frames, the transmission of the uplink feedback frame being part of a second uplink MU PHY transmission that also includes simultaneous transmissions by the one or more second client stations of one or more other uplink feedback frames to the access point.

18. The first client station of claim 10, wherein:
the one or more indications of one or more types of feedback information that are to be communicated between the first client station and the access point in the range measurement session further include a second indication of whether channel estimate information associated with range measurements are to be communicated between the first client station and the access point in the range measurement session;
the one or more IC devices are further configured to use the one or more indications of the one or more types of feedback information received from the access point to determine whether channel estimate information associated with range measurements are to be communicated between the first client station and the access point in the range measurement session; and
the first downlink feedback frame for the first client station further includes, when channel estimate information associated with range measurements are to be communicated between the first client station and the access point, first channel estimate information corresponding to reception by the access point of a) the respective first NDP transmitted by the first client station or b) the third NDP previously transmitted by the first client station.

19. The first client station of claim 10, wherein the wireless network interface further comprises:
a media access control (MAC) processor implemented using the one or more IC devices, the MAC processor configured to use the one or more indications of the one or more types of feedback information received from the access point to determine the one or more types of feedback information that are to be communicated between the first client station and the access point in the range measurement session; and
a PHY processor implemented using the one or more IC devices, the PHY processor configured to generate the respective first NDP.

20. The first client station of claim 19, wherein the wireless network interface device further comprises one or more wireless transceivers implemented using the one or more IC devices, the one or more wireless transceivers configured to:
receive the first downlink PHY data unit;
transmit the respective first NDP;
receive the second downlink PHY data unit;
receive the third downlink PHY data unit; and
receive the fourth downlink PHY data unit.

21. The first client station of claim 20, further comprising:
one or more antennas coupled to the one or more wireless transceivers.

22. The first client station of claim 19, further comprising:
a host processor coupled to the wireless network interface device.

* * * * *